(12) United States Patent
Park et al.

(10) Patent No.: US 9,167,604 B2
(45) Date of Patent: Oct. 20, 2015

(54) METHOD AND APPARATUS FOR A SCANNING IN WLAN

(71) Applicant: LG ELECTRONICS INC., Seoul (KR)

(72) Inventors: Gi Won Park, Seoul (KR); Ki Seon Ryu, Seoul (KR); Jin Sam Kwak, Seoul (KR); Han Gyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 14/020,560

(22) Filed: Sep. 6, 2013

(65) Prior Publication Data

US 2014/0064128 A1 Mar. 6, 2014

Related U.S. Application Data

(60) Provisional application No. 61/697,783, filed on Sep. 6, 2012, provisional application No. 61/717,078, filed on Oct. 22, 2012, provisional application No. 61/746,550, filed on Dec. 27, 2012, provisional application No. 61/869,753, filed on Aug. 25, 2013.

(51) Int. Cl.
*H04W 76/00* (2009.01)
*H04W 48/12* (2009.01)
*H04W 48/18* (2009.01)

(52) U.S. Cl.
CPC .............. *H04W 76/00* (2013.01); *H04W 48/12* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 2006/0029023 A1* | 2/2006 | Cervello et al. | 370/333 |
| 2008/0070523 A1* | 3/2008 | Masri et al. | 455/161.1 |
| 2010/0323749 A1* | 12/2010 | Lee et al. | 455/524 |
| 2011/0090890 A1* | 4/2011 | Seok et al. | 370/338 |
| 2013/0294232 A1* | 11/2013 | Segev et al. | 370/230 |
| 2013/0294270 A1* | 11/2013 | Yang et al. | 370/252 |
| 2013/0294354 A1* | 11/2013 | Zhang et al. | 370/329 |
| 2014/0010157 A1* | 1/2014 | Jing-Rong | 370/328 |
| 2015/0036647 A1* | 2/2015 | Seok | 370/329 |

* cited by examiner

*Primary Examiner* — Chirag Shah
*Assistant Examiner* — Amar Persaud
(74) *Attorney, Agent, or Firm* — Birch, Stewart, Kolasch & Birch, LLP

(57) ABSTRACT

The methods and an apparatuses for scanning in WLAN are disclosed. A method of a scanning of a station (STA) may include monitoring a channel during a probedelay based on a MAC sublayer management entity (MLME)-SCAN.request primitive indicating an active scanning for a target Access Point (AP), receiving a frame including a channel congestion indicator from an AP during the probedelay, generating a MLME-SCAN.change request primitive to request a change of a scanning type parameter included in the MLME-SCAN. request primitive when the channel congestion indicator indicates that the channel is congested, generating a MLME-SCAN.change confirm primitive to confirm the change of the scanning type parameter included in the MLME-SCAN.request primitive as a response of the MLME-SCAN.change request primitive, and performing a passive scanning for the target AP based on the MLME-SCAN.change confirm primitive.

12 Claims, 21 Drawing Sheets

FIG. 1
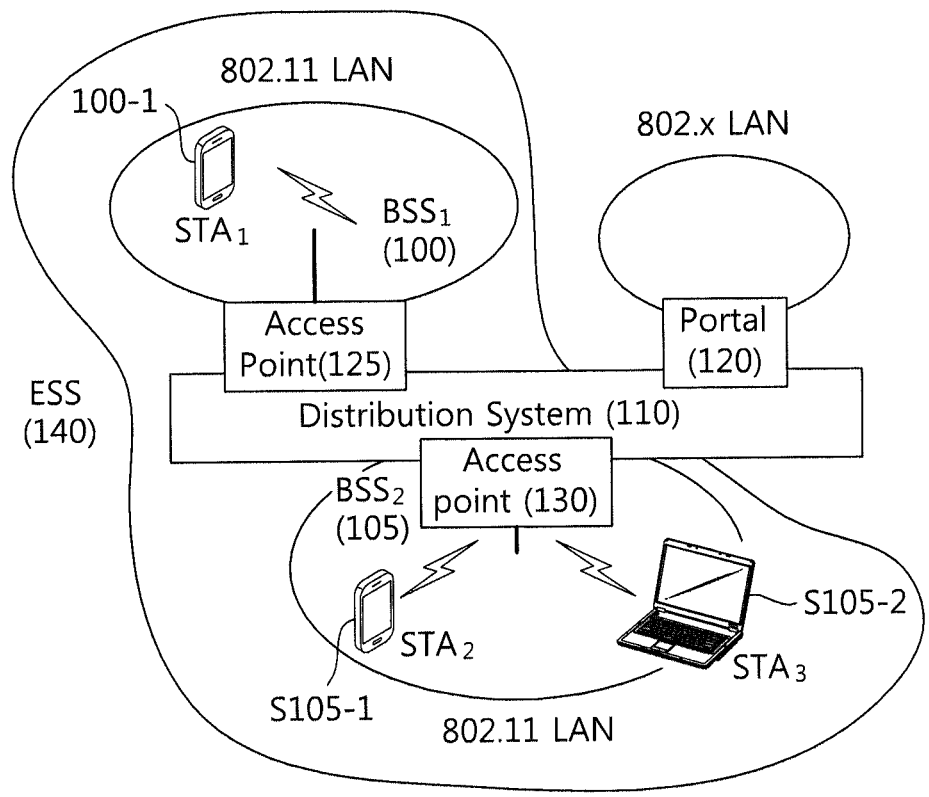
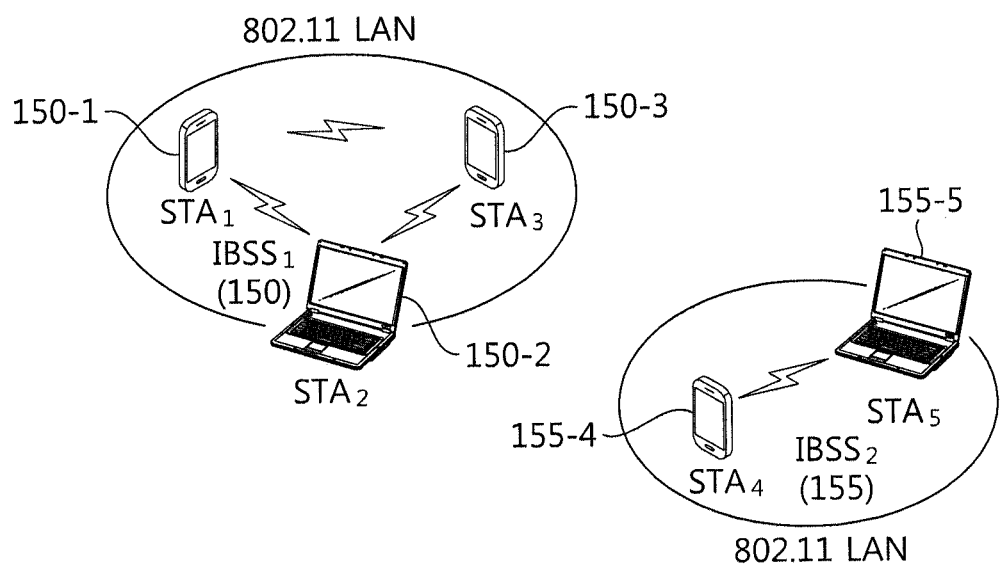

FIG. 6
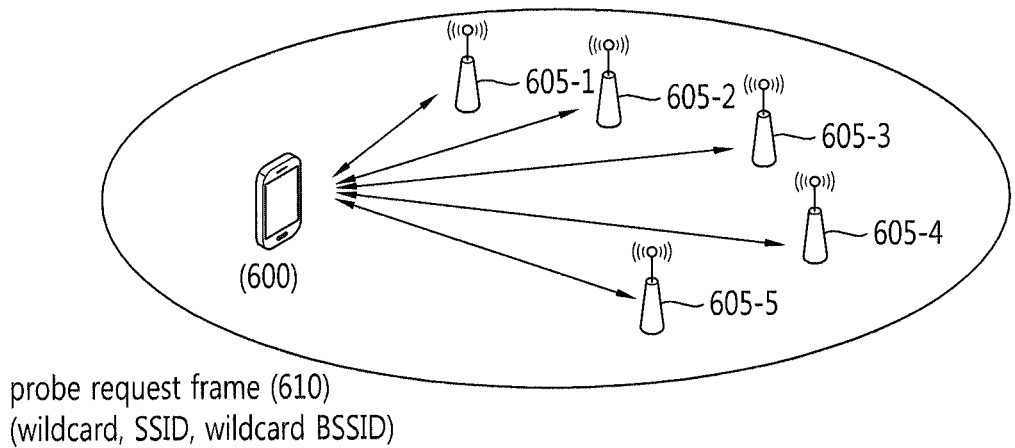
probe request frame (610)
(wildcard, SSID, wildcard BSSID)
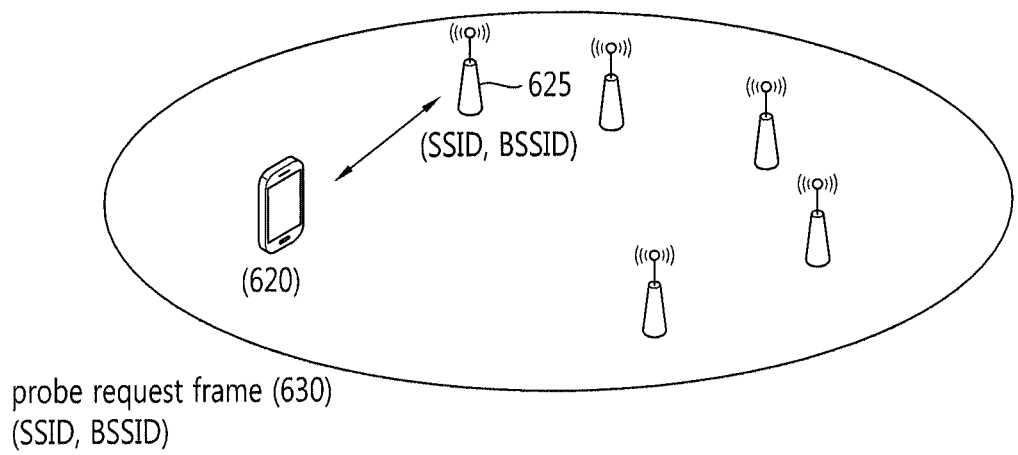
probe request frame (630)
(SSID, BSSID)
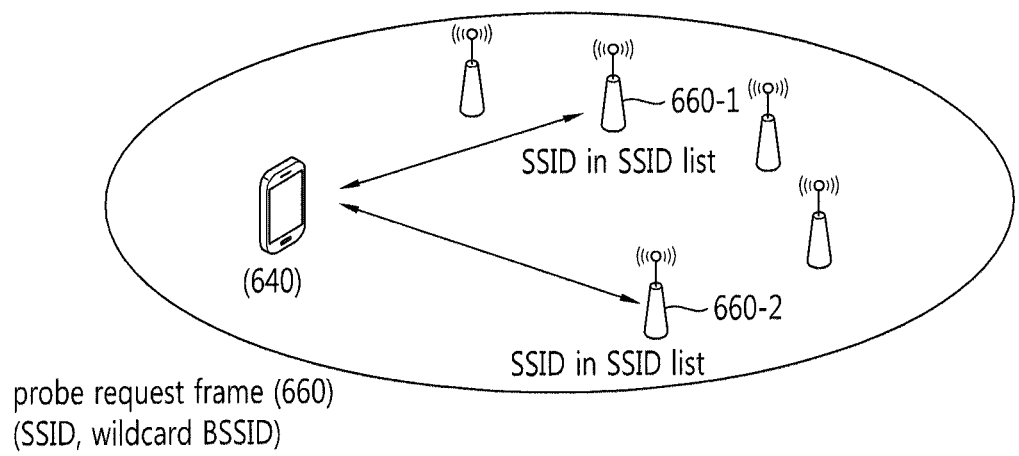
probe request frame (660)
(SSID, wildcard BSSID)

FIG. 9

| channellist | |
|---|---|
| scanning priority 1 | channel #1 (910) |
| scanning priority 2 | channel #3 (930) |
| scanning priority 3 | channel #9 (900) |
| scanning priority 4 | channel #5 |
| scanning priority 5 | channel #6 | reconfiguring priority reconfiguring priority channellist after reconfiguring priority

| channellist | |
|---|---|
| scanning priority 1 | channel #9 |
| scanning priority 2 | channel #1 |
| scanning priority 3 | channel #3 |
| scanning priority 4 | channel #5 |
| scanning priority 5 | channel #7 |

METHOD AND APPARATUS FOR A SCANNING IN WLAN

CROSS-REFERENCE TO RELATED APPLICATIONS

This application claims the benefit of priority of U.S. Provisional application No. 61/697,783 filed on Sep. 6, 2012, No. 61/717,078 filed on Oct. 22, 2012, No. 61/746,550 filed on Dec. 27, 2012 and No. 61/869,753 filed on Aug. 25, 2013, all of which are incorporated by reference in their entirety herein.

BACKGROUND OF THE INVENTION

1. Field of the Invention

The present invention relates to a method and an apparatus for scanning and, more particularly, to a scanning method and apparatus for a station (STA).

2. Related Art

Recent Wireless LAN (WLAN) technology is basically evolving into three directions. There are Institute of Electrical and Electronic Engineers (IEEE) 802.11ac and IEEE 802.11ad as efforts to further increase the transfer rate on the extension line of the existing WLAN evolution direction. IEEE 802.11 ad is WLAN technology using a 60 GHz band. Furthermore, a wide area WLAN that utilizes a frequency band of less than 1 GHz in order to enable wider area transfer than that of the existing WLAN in distance is recently emerging. The wide-area WLAN includes IEEE 802.11af utilizing a TV White Space (TVWS) band and IEEE 802.11ah utilizing a 900 MHz band. A main object of the wide-area WLANs is to extend extended range Wi-Fi service as well as a smart grid and a wide-area sensor network. Furthermore, the existing WLAN Medium Access Control (MAC) technology is problematic in that an initial link setup time is very long according to circumstances. In order to solve this problem and in order for an STA to rapidly access an AP, IEEE 802.11 ai standardization is recently carried out actively.

IEEE 802.11ai is MAC technology in which a rapid authentication procedure is handled in order to significantly reduce the initial setup and association time of a WLAN, and standardization activities for IEEE 802.11ai has started as a formal task group on January, 2011. In order to enable a rapid access procedure, in IEEE 802.11ai, a discussion on procedure simplification in fields, such as AP discovery, network discovery, Time Synchronization Function (TSF) synchronization, authentication & association, and a procedure convergence with a higher layer, is in progress. From among them, ideas, such as procedure convergence utilizing the piggyback of a Dynamic Host Configuration Protocol (DHCP), the optimization of a full Extensible Authentication Protocol (EAP) using a concurrent IP, and efficient and selective Access Point (AP) scanning, are being actively discussed.

SUMMARY OF THE INVENTION

An object of the present invention is to provide a scanning method.

Another object of the present invention is to provide an apparatus for performing a scanning method.

In an aspect of the present invention, a method of a scanning of a station (STA) may include monitoring a channel during a probedelay based on a MAC sublayer management entity (MLME)-SCAN.request primitive indicating an active scanning for a target Access Point (AP); receiving a frame including a channel congestion indicator from an AP during the probedelay; generating a MLME-SCAN.change request primitive to request a change of a scanning type parameter included in the MLME-SCAN.request primitive when the channel congestion indicator indicates that the channel is congested; generating a MLME-SCAN.change confirm primitive to confirm the change of the scanning type parameter included in the MLME-SCAN.request primitive as a response of the MLME-SCAN.change request primitive; and performing a passive scanning for the target AP based on the MLME-SCAN.change confirm primitive.

In another aspect of the present invention, a station (STA) for a wireless local area network may include a radio frequency unit configured to receive and transmit radio signal and a processor operatively coupled with the RF unit and configured to monitor a channel during a probedelay based on a MAC sublayer management entity (MLME)-SCAN.request primitive indicating an active scanning for a target Access Point (AP); receive a frame including a channel congestion indicator from an AP during the probedelay; generate a MLME-SCAN.change request primitive to request a change of a scanning type parameter included in the MLME-SCAN.request primitive when the channel congestion indicator indicates that the channel is congested; generate a MLME-SCAN.change confirm primitive to confirm the change of the scanning type parameter included in the MLME-SCAN.request primitive as a response of the MLME-SCAN.change request primitive; and perform a passive scanning for the target AP based on the MLME-SCAN.change confirm primitive. The scanning procedure can be performed rapidly.

BRIEF DESCRIPTION OF THE DRAWINGS

FIG. 1 is a conceptual diagram showing the configuration of a Wireless Local Area Network (WLAN);

FIG. 6 is a conceptual diagram showing a method of transmitting a probe request frame;

FIG. 9 is a conceptual diagram showing a channel list in accordance with an embodiment of the present invention;

DESCRIPTION OF EXEMPLARY EMBODIMENTS

FIG. 1 is a conceptual diagram showing the configuration of a Wireless Local Area Network (WLAN).

The upper portion of FIG. 1 showing the configuration of an infrastructure network according to Institute of Electrical and Electronic Engineers (IEEE) 802.11.

Referring to The upper portion of FIG. 1, the WLAN system can include one or more Basic Service Sets (BSSs) 100 and 105. The BSSs 100 and 105, and each is a set of an AP and an STA, such as an Access Point (AP) 125 and a Station STA1 100-1 which are successfully synchronized with each other and capable of communicating with each other. The BSS is not a concept indicative of a specific area. The BSS 105 may include one or more STAs 105-1 and 105-2 that can be associated in one AP 130.

An infrastructure BSS can include at least one STA, the APs 125 and 130 providing distribution service, and a Distribution Systems (DS) 110 coupling a plurality of APs.

The distribution system 110 can implement an Extended Service Set (ESS) 140 by coupling some BSSs 100 and 105. The ESS 140 can be used as a term that indicates one network over which one or more APs 125 and 230 are connected through the distribution system 110. APs included in one ESS 140 can have the same service set identification (SSID).

A portal 120 can function as a bridge for performing a connection between a WLAN network (i.e., IEEE 802.11) and another network (e.g., 802.X).

In an infrastructure network, such as that of the upper portion of FIG. 1, a network between the APs 125 and 130 and a network between the APs 125 and 130 and the STAs 100-1, 105-1, and 105-2 can be implemented. However, a network can be configured between STAs so that the STAs can perform communication even without the APs 125 and 130. A network that is configured between STAs so that the STAs can perform communication without the APs 125 and 130 is defined as an Ad-Hoc network or an independent Basic Service Set (BSS).

The lower portion of FIG. 1 is a conceptual diagram showing an independent BSS.

Referring to the lower portion of FIG. 1, the Independent BSS (IBSS) is a BSS that operates in an Ad-Hoc mode. The IBSS does not include a centralized management entity because it does not include an AP. That is, in the IBSS, STAs 150-1, 150-2, 150-3, 155-4, and 155-5 are managed in a distributed manner. In the IBSS, all the STAs 150-1, 150-2, 150-3, 155-4, and 155-5 can be mobile STAs, and they form a self-contained network because they cannot access a distribution system.

An STA is a specific function medium, including Medium Access Control (MAC) that complies with the rules of the IEEE 802.11 standard and a physical layer interface for a radio medium, and can be used as a meaning that includes both an AP STA and a non-AP STA in a broad sense.

An STA may be called in various names, such as a mobile terminal, a wireless device, a Wireless Transmit/Receive Unit (WTRU), User Equipment (UE), a Mobile Station (MS), a mobile subscriber unit, or simply a user.

Figure 2:
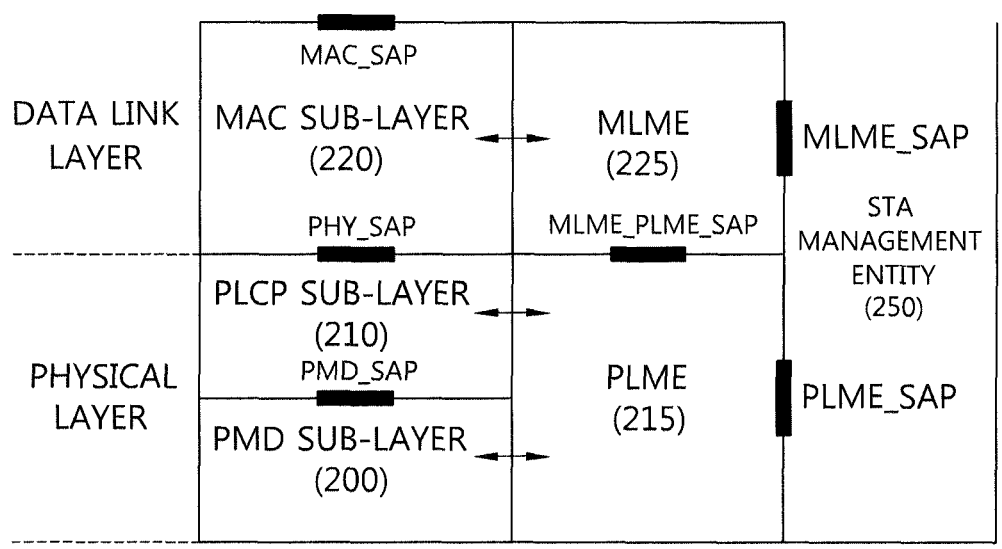
FIG. 2 is a diagram showing the hierarchical architecture of a WLAN system that is supported by IEEE 802.11.

FIG. 2 is a diagram showing the hierarchical architecture of a WLAN system that is supported by IEEE 802.11.

FIG. 2 schematically shows the PHY architecture of the WLAN system.

The PHY architecture of the WLAN system can include a Medium Access Control (MAC) sublayer 220, a Physical Layer Convergence Procedure (PLCP) sublayer 210, and a Physical Medium Dependent (PMD) sublayer 200. The PLCP sublayer 210 is implemented so that the MAC sublayer 220 can operate with minimum dependency on the PMD sublayer 200. The PMD sublayer 200 can function as a transmission interface through which data is transmitted and received between a plurality of STAs.

The MAC sublayer 220, the PLCP sublayer 210, and the PMD sublayer 200 can include management entities conceptually.

The management entity of the MAC sublayer 220 is called a MAC Layer Management Entity (MLME) 225, and the management entity of the PHY layer is called a PHY Layer Management Entity (PLME) 215. The management entities can provide interfaces through which a layer management operation is performed. The PLME 215 is connected to the MLME 225 and capable of performing the management operation of the PLCP sublayer 210 and the PMD sublayer 200. The MLME 225 can also be connected to the PLME 215 and capable of performing the management operation of the MAC sublayer 220.

In order for a correct MAC layer operation to be performed, an STA Management Entity (SME) 250 can be present. The SME 250 can operate as an element unit that is independent of the layer. In the MLME, the PLME, and the SME, information can be transmitted and received between element units based on primitives.

An operation in each sublayer is disclosed below in brief. The PLCP sublayer 210 transfers a MAC Protocol Data Unit (MPDU), received from the MAC sublayer 220, to the PMD sublayer 200 or transfers a frame, received from the PMD sublayer 200, to the MAC sublayer 220 under the instruction of the MAC layer between the MAC sublayer 220 and the PMD sublayer 200. The PMD sublayer 200 can transmit and receive data between a plurality of STAs through a radio medium as a PLCP lower layer. The MPDU transferred by the MAC sublayer 220 is called a Physical Service Data Unit (PSDU) in the PLCP sublayer 210. The MPDU is similar to the PSDU, but each MPDU can be different from each PSDU if an Aggregated MPDU (A-MPDU) in which a plurality of MPDUs is aggregated is transferred.

The PLCP sublayer 210 adds an additional field, including information necessary for a physical layer transmitter/receiver, in a process of receiving the PSDU from the MAC sublayer 220 and transferring the received PSDU to the PMD sublayer 200. Here, the added field can be a PLCP preamble, a PLCP header, and tail bits necessary to return a convolution encoder to a zero state in the PSDU. The PLCP preamble can function to enable a receiver to prepare a synchronization function and antenna diversity before the PSDU is transmitted. A data field can include padding bits, a service field including a bit sequence for initializing a scrambler, and a coded sequence encoded from a bit sequence to which tail bits have been added in the PSDU. Here, Binary Convolutional Coding (BCC) encoding or Low Density Parity Check (LDPC) encoding can be selected as an encoding method depending on an encoding method supported for an STA that receives a PLCP Protocol Data Unit (PPDU). The PLCP header can include a field including information about the PPDU.

In the PLCP sublayer 210, the PPDU is generated by adding the above-described field to the PSDU and transmitted to a reception STA via the PMD sublayer 200. The reception STA receives the PPDU, obtains information necessary to restore data from the PLCP preamble and the PLCP header, and restores the data using the information.

Figure 3:
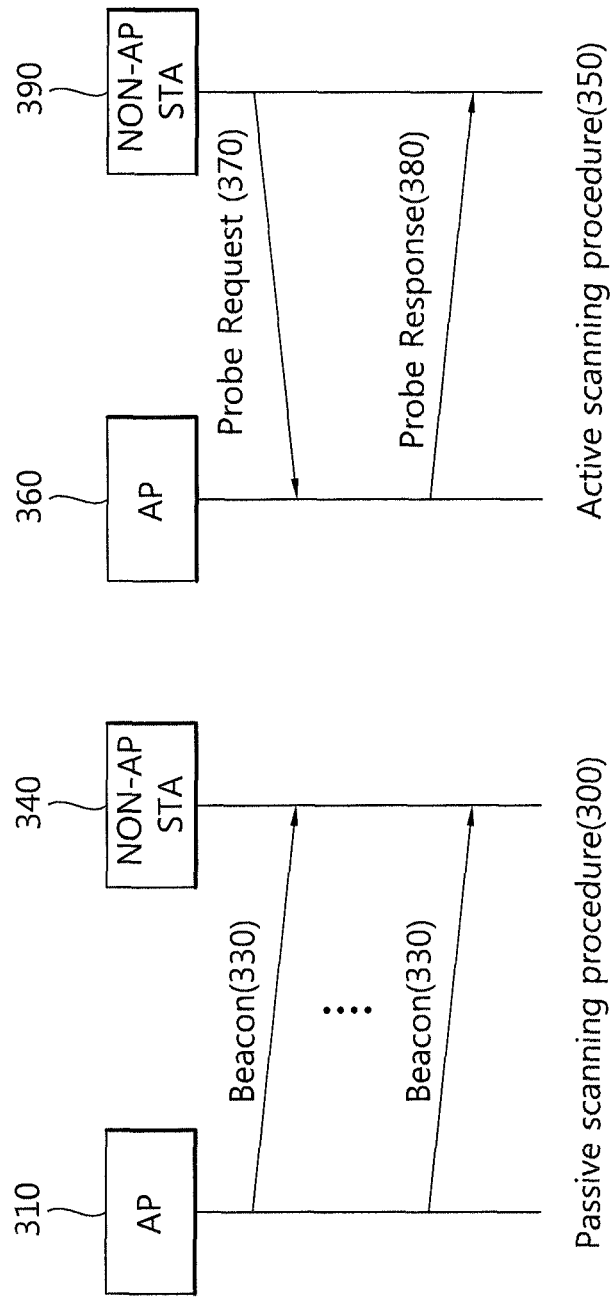
FIG. 3 is a conceptual diagram showing a scanning method in a WLAN.

FIG. 3 is a conceptual diagram showing a scanning method in a WLAN.

Referring to FIG. 3, the scanning method can be divided into a passive scanning procedure 300 and an active scanning procedure 350.

Referring to the left portion of FIG. 3, the passive scanning procedure 300 can be performed in response to a beacon frame 330 that is periodically broadcasted by an AP 310. The AP 310 of a WLAN broadcasts the beacon frame 330 to a non-AP STA 340 in a specific cycle (e.g., 100 msec). The beacon frame 330 can include information about a current network. The non-AP STA 340 can receive the periodically broadcasted beacon frame 330, receive network information from the beacon frame 330, and perform scanning on a channel along with the AP 310 with which an authentication/association process will be performed based on the network information.

In the passive scanning method 300, the non-AP STA 340 has only to receive the beacon frame 330 transmitted by the AP 310 without sending a frame. Accordingly, the passive scanning procedure 300 is advantageous in that overall overhead generated due to the transmission and reception of data over a network is small. However, the passive scanning procedure 300 is disadvantageous in that the time taken to perform scanning is increased because scanning is inevitably manually performed in proportion to the cycle of the beacon frame 330. A detailed description of the beacon frame is disclosed in 8.3.3.2 Beacon Frame of IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)' disclosed on November, 2011. In IEEE 802.11ai, a beacon frame having another format can be additionally used, and this beacon frame can be called a (Fast Initial Link Setup (FILS)) beacon frame. Furthermore, a measurement pilot frame is a frame that uses only some information of the beacon frame and can be used in a scanning procedure. The measurement pilot frame is disclosed in an IEEE 802.11 8.5.8.3 measurement pilot format.

Furthermore, an FILS discovery frame may be defined. The FILS discovery frame is a frame that is transmitted by each AP between the transmission cycles of a beacon frame and can be a frame having a shorter cycle than the beacon frame. That is, the FILS discovery frame is transmitted in a cycle having a smaller value than the transmission cycle of the beacon frame. The FILS discovery frame can include information about the identifier (SSID or BSSID) of an AP that sends the FILS discovery frame. The FILS discovery frame can be transmitted to an STA prior to the beacon frame so that the STA previously discovers that an AP is present in a corresponding channel. An interval at which the FILS discovery frame is transmitted by one AP is called an FILS discovery frame transmission interval. Some of information included in the beacon frame can be included in the FILS discovery frame and transmitted. The FILS discovery frame can further include information about the time when a neighbor AP sends the beacon frame.

Referring to the right portion of FIG. 3, the active scanning procedure 350 refers to a method in which a non-AP STA 390 initiatively performs scanning by sending a probe request frame 370 to an AP 360.

After receiving the probe request frame 370 from the non-AP STA 390, the AP 360 can wait for a random time in order to prevent a collision between frames, include network information in a probe response frame 380, and send the probe response frame 380 to the non-AP STA 390. The non-AP STA 390 can obtain the network information based on the received probe response frame 380 and stop the scanning process.

The active scanning procedure 350 is advantageous in that the time taken to perform scanning is short because the non-AP STA 390 initiatively performs scanning. However, the active scanning procedure 350 is disadvantageous in that network overhead for the transmission and reception of frames is increased because the non-AP STA 390 needs to send the probe request frame 370. The probe request frame 370 is disclosed in Paragraph IEEE 802.11 8.3.3.9, and the probe response frame 380 is disclosed in Paragraph IEEE 802.11 8.3.3.10.

After terminating the scanning, the AP and the STA can perform authentication and association processes.

Figure 4:
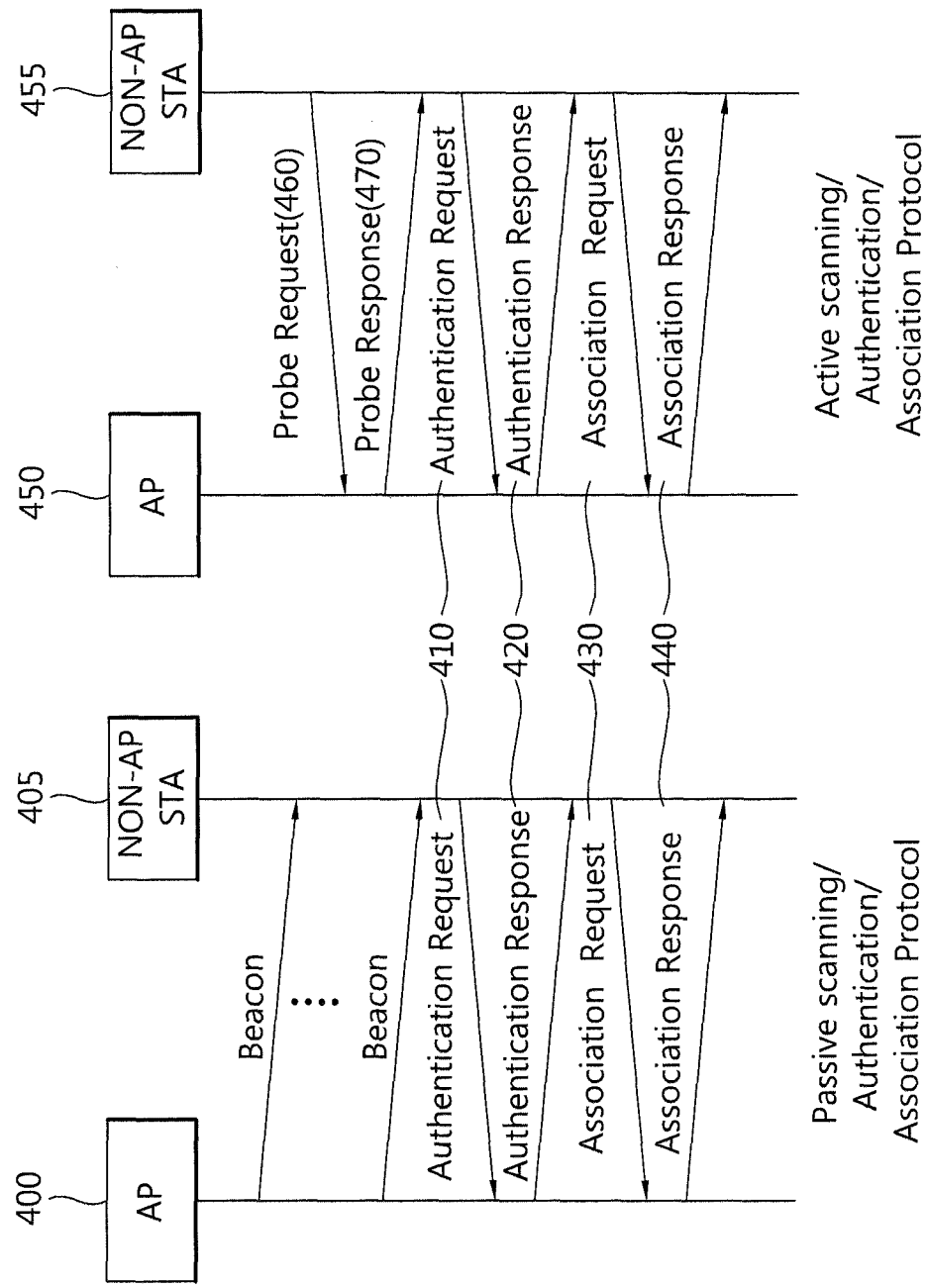
FIG. 4 is a conceptual diagram showing authentication and association processes after the scanning of an AP and an STA.

FIG. 4 is a conceptual diagram showing authentication and association processes after the scanning of an AP and an STA.

Referring to FIG. 4, after passive/active scanning is performed, authentication and association processes with one of scanned APs can be performed.

The authentication and association processes can be performed, for example, by way of 2-way handshaking. The left portion of FIG. 4 is a conceptual diagram showing authentication and association processes after passive scanning, and the right portion of FIG. 4 is a conceptual diagram showing authentication and association processes after active scanning.

The authentication and association processes can be equally performed by exchanging an authentication request frame 410/an authentication response frame 420 and an association request frame 430/an association response frame 440 between APs 400 and 450 and non-AP STA 405 and 455 irrespective of whether an active scanning method or a passive scanning method has been used.

The authentication process can be performed when the non-AP STAs 405 and 455 send the authentication request frame 410 to the respective APs 400 and 450. In response to the authentication request frame 410, the APs 400 and 450 can send the authentication response frame 420 to the respective non-AP STAs 405 and 455. An authentication frame format is disclosed in IEEE 802.11 8.3.3.11.

The association process can be performed when the non-AP STAs 405 and 455 send the association request frame 430 to the respective APs 400 and 405. In response to the association request frame 430, the APs 405 and 455 can send the association response frame 400 to the respective non-AP STAs 400 and 450. The transmitted association request frame 430 includes information about the capabilities of the non-AP STAs 405 and 455. The APs 400 and 450 can determine whether support for the non-AP STAs 405 and 355 is possible or not based on the capability information of the non-AP STAs 405 and 455. If, as a result of the determination, it is determined that support for the non-AP STAs 405 and 455 is possible, the APs 400 and 450 can include information about whether or not the association request frame 430 has been accepted, a reason for the acceptance, and information about capabilities supportable by the APs 400 and 450 in the association response frame 440 and send the association response frame 440 to the non-AP STA 405 and 455. An association frame format is disclosed in IEEE 802.11 8.3.3.5/8.3.3.6.

If up to the association process is performed, data is normally transmitted and received. If the association process is not performed, association is performed again based on a reason that the association process has not been performed, or association with another AP can be performed.

Figure 5:
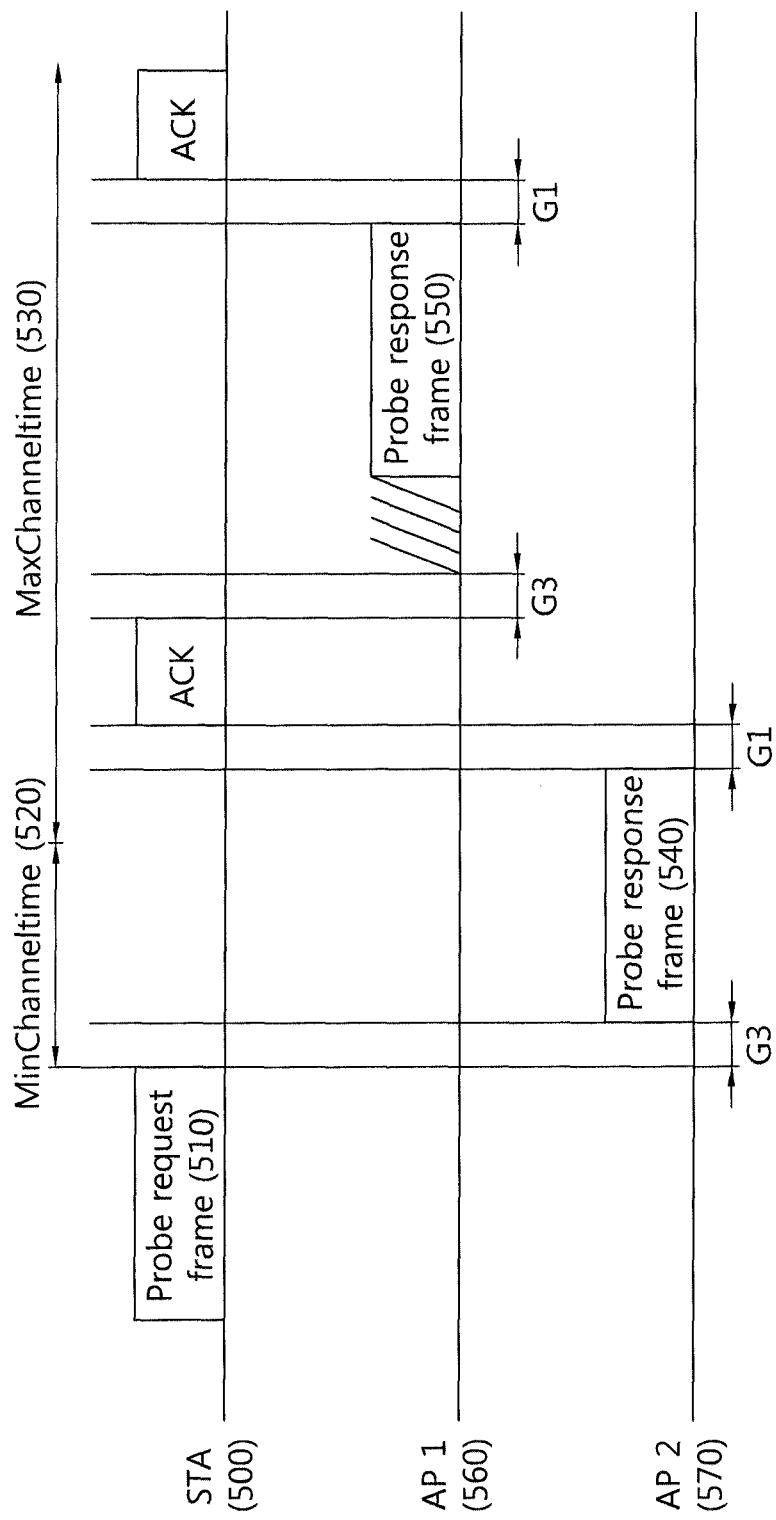
FIG. 5 is a conceptual diagram showing an active scanning procedure.

FIG. 5 is a conceptual diagram showing an active scanning procedure.

Referring to FIG. 5, the active scanning procedure can be performed in accordance with the following steps.

(1) Determine whether or not an STA 500 is ready to perform the active scanning procedure.

The STA 500 can perform active scanning, for example, when a probe delay time expires or after waiting until it receives specific signaling information (e.g., PHY-RX-START.indication primitive).

The probe delay time is delay generated before the STA 500 sends a probe request frame 510 when performing active scanning. The PHY-RXSTART.indication primitive is a signal that is transmitted from a PHY layer to a local MAC layer. The PHY-RXSTART.indication primitive can signal information, indicating that a PLCP Protocol Data Unit (PPDU) including a valid Physical Layer Convergence Protocol (PLCP) header has been received from a PLCP, through the MAC layer.

(2) Perform basic access.

In the 802.11 MAC layer, several STAs can share a radio medium using, for example, a Distributed Coordination Function (DCF) that is a contention-based function. The DCF can prevent a collision between STAs through a back-off scheme using Carrier Sense Multiple Access/Collision Avoidance (CSMA/CA) as an access protocol. The STA 500 can send the probe request frame 510 to APs 560 and 570 in accordance with a basic access method.

(3) Include information (e.g., service set identification (SSID) and basic service set identification (BSSID) information) for specifying the APs 560 and 570, included in an MLME-SCAN.request primitive, in the probe request frame 510 and send the probe request frame 510.

The BSSID is an indicator for specifying APs, and the BSSID can have a value corresponding to the MAC address of the AP. The SSID is a network name for specifying APs, which can be read by a person who operates an STA. The BSSID or the SSID or both can be used to specify APs.

The STA 500 can specify APs based on the information for specifying the APs 560 and 570, which is included in the MLME-SCAN.request primitive. The specified APs 560 and 570 can send respective probe response frames 550 and 540 to the STA 500. The STA 500 can unicast, multi-cast, or broadcast the probe request frame 510 by sending the probe request frame 510 including information about an SSID and BSSID. A method of unicasting, multi-casting, or broadcasting the probe request frame 510 based on the SSID and BSSID information will be additionally described with reference to FIG. 5.

For example, if an SSID list is included in the MLME-SCAN.request primitive, the STA 500 can send the probe request frame 510 including the SSID list. The APs 560 and 570 can receive the probe request frame 510, determine SSIDs included in the SSID list that has been included in the received probe request frame 510, and determine whether or not to send the probe response frames 550 and 540 to the STA 500 based on the determined SSIDs.

(4) Reset a probe timer to 0 and drive the probe timer.

The probe timer can be used to check a minimum channel time 'MinChanneltime' 520 and a maximum channel time 'MaxChanneltime' 530. The minimum channel time 520 and the maximum channel time 530 can be used to control the active scanning operation of the STA 500.

The minimum channel time 520 can be used for the STA 500 to perform an operation of changing a channel on which active scanning is performed. For example, if the STA 500 has not received the probe response frames 550 and 540 until the probe timer reaches the minimum channel time 520, the STA 500 can change a current scanning channel into another scanning channel and perform scanning on another channel. If the STA 500 receives the probe response frame 550 before the probe timer reaches the minimum channel time 520, when the probe timer reaches the maximum channel time 530, the STA 500 can process the received probe response frames 540 and 550.

The STA 500 can discover a PHY-CCA.indication primitive before the probe timer reaches the minimum channel time 520 and determine whether or not other frames (e.g., the probe response frames 540 and 550) have been received before the minimum channel time 520.

The PHY-CCA.indication primitive can send information about the state of a medium from a physical layer to a MAC layer. The PHY-CCA.indication primitive can inform the state of a current channel using a channel state parameter indicative of a busy state (simply called busy) when a channel is not available and of an idle state (simply called idle) when a channel is available. If the PHY-CCA.indication is discovered to be busy, the STA 500 can determine that the probe response frames 550 and 540 received by the STA 500 are present. If the PHY-CCA.indication is discovered to be idle, the STA 500 can determine that the probe response frames 550 and 540 received by the STA 500 are not present.

If the PHY-CCA.indication is discovered to be idle, the STA 500 can set a Net Allocation Vector (NAV) to 0 and scan a next channel. If the PHY-CCA.indication is discovered to be busy, the STA 500 can perform processing on the probe response frames 550 and 540 that are received after the probe timer reaches the maximum channel time 530. After performing processing on the received probe response frames 550 and 540, the STA 500 can set the NAV to 0 and scan a next channel.

In the following embodiments of the present invention, to determine whether the probe response frames 550 and 540 received by the STA 500 are present or not can include the meaning that a channel state is determined using the PHY-CCA.indication primitive.

(5) An MLME can signal an MLME-SCAN.confirm primitive if all channels included in a channel list 'ChannelList' are scanned. The MLME-SCAN.confirm primitive can include BSSDescriptionSet that includes all pieces of information obtained in a scanning process.

If an active scanning method is used, the STA 500 can perform monitoring for determining whether the PHY-CCA.indication parameter is busy or not until the probe timer reaches the minimum channel time.

Detailed information included in the MLME-SCAN.request primitive is as follows. An STA can receive the MLME-SCAN.request primitive from the MLME in order to perform scanning. The MLME-SCAN.request primitive is generated by the SME. The MLME-SCAN.request primitive can be used to determine whether another BSS with which an STA will be associated is present or not.

The MLME-SCAN.request primitive can include pieces of information, such as BSSType, BSSID, SSID, ScanType, ProbeDelay, ChannelList, MinChannelTime, MaxChannelTime, RequestInformation, SSID List, ChannelUsage, AccessNetworkType, HSSID, and MeshID, VendorSpecificInfo. A detailed description of the MLME-SCAN.request primitive is disclosed in 6.3.3.2 MLME-SCAN.request of IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' disclosed on November, 2011.

Table 1 below schematically shows information included in the MLME-SCAN.request primitive.

TABLE 1

| Name | Description |
| --- | --- |
| BSSType | Determine whether an infrastructure BSS, IBSS, Mesh Basic Service Set (MBSS) or all of them are included in the scan |
| BSSID | Identifies a specific or wildward BSSID |
| SSID | Specifies a desired SSID or a wildward SSID |
| ScanType | Indicates either active or passive scanning |
| ProbeDelay | Delay (in microseconds) to be used before transmitting a probe frame during active scanning |
| ChannelList | Specifies a list of channels that are examined when scanning a BSS |
| MinChannelTime | A minimum time (in TU) to spend on each channel when scanning |
| MaxChannelTime | A maximum time (in TU) to spend on each channel when scanning |
| RequirementInformation | This element is optionally present if dot11RatioMeasurementActivated is true and is placed in a probe request frame to request that a responding STA includes requested information in a probe response |
| SSID List | One or more SSID elements that are optionally present when dot11RatioMeasurementActivated is true |
| ChannelUsage | Specifies request types for a ChannelUsage request |
| AccessNetworkType | Specifies a desired specific access network type or a wildcard access network type This field is present when dot11InterworkingServiceActivated is true |
| HESSID | Specifies a desired specific HESSID network identifier or a wildcard network identifier. This field is present when dot11InterworkingServiceActivated is true |
| Mesh ID | Only present if BSSType = MESH or BSSType = ANY_BSS Specifies a desired Mesh ID or a wildcard Mesh ID |
| RequestParameters | This parameter defines responding STAs |
| ReportingOption | Indicate a result reporting mode |
| APConfigurationChangeCount | When a specific BSSID is indicated in the MLME-SCAN-request, the APConfigurationChangeCount associated with the stored configuration of an AP is optionally provided |
| VendorSpecificInfo | Information individually added according to a service provider |

A request parameter included in the MLME-SCAN.request.primitive can be used to determine whether or not a responding STA will send a probe response frame. The request parameter can include information to request that the information of another BSS be included in the probe response frame. The request parameter can further include a report request field, a delay reference field, and a maximum delay limit field.

The report request field is information to request that information of another BSS be included in the probe response frame. The delay reference field can include information about a delay type that is applied as a response to the probe request frame. The maximum delay limit field can include maximum access delay information about a delay type which is indicated by the delay reference field.

In addition, the request parameter can further include a minimum date rate field or a received signal intensity limit field or both. The minimum date rate field includes information about the lowest total date rate in sending an MSDU or an A-MSDU. The received signal intensity limit field can include information about the limit value of a signal that is necessary for the receiver of the probe request frame to respond to the probe request frame.

FIG. 6 is a conceptual diagram showing a method of transmitting a probe request frame.

FIG. 6 discloses a method of an STA broadcasting, multicasting, or unicast a probe request frame.

The upper portion of FIG. 6 shows a method of an STA 600 broadcasting a probe request frame 610.

The STA 600 can include a wildcard SSID and a wildcard BSSID in the probe request frame 610 and then broadcast the probe request frame 610.

The wildcard SSID and the wildcard BSSID can be used as identifiers for indicating all APs 605-1, 605-2, 605-3, 605-4, and 605-6 which are included in the transmission coverage of the STA 600.

If the STA 600 sends the probe request frame 610 including the wildcard SSID and the wildcard BSSID, the APs 605-1, 605-2, 605-3, 605-4, and 605-6 can send probe response frames to the STA 600 in response to the probe request frame 610.

If the APs 605-1, 605-2, 605-3, 605-4, and 605-6 send the probe response frames to the STA 600 within a specific time in response to the broadcasted probe request frame 610, a problem may occur because the STA 600 has to receive too many probe response frames and process the received probe response frames at once.

The middle portion of FIG. 6 is a method of an STA 620 unicasting a probe request frame 630.

Referring to the middle portion of FIG. 6, if the STA 620 unicasts the probe request frame 630, the STA 620 can send the probe request frame 630 including information about a specific SSID/BSSID of an AP. Only an AP 625 corresponding to the SSID/BSSID specified by the STA 620, from among APs which have received the probe request frame 630, can send a probe response frame to the STA 620.

The lower portion of FIG. 6 is a method of an STA 640 multi-casting a probe request frame 660.

Referring to the lower portion of FIG. 6, the STA 640 can include an SSID list and a wildcard BSSID in the probe request frame 660 and then send the probe request frame 660. APs 660-1 and 660-2 corresponding to SSIDs included in the SSID list that has been included in the probe request frame 660, from among APS which have received the probe request frame 660, can send probe response frames to the STA 640.

In performing a scanning procedure, an STA can sense a channel for a probe delay interval and determine whether or not a frame received through the channel is present.

An existing active scanning procedure is described in detail below. An STA can receive the MLME-SCAN-request primitive indicative of active scanning which has been generated in the MLME. The STA can determine a method of transmitting (unicasting, multi-casting, or broadcasting) a probe request frame based on the MLME-SCAN-request primitive and also determine an BSSID and SSID to be included in the probe request frame.

The STA can determine whether or not a probe delay time has expired and whether or not a valid frame has been received through the PHY layer of the STA. The probe delay can be used by the STA, performing active scanning, as a channel discovery interval that is used before the STA sends a probe request frame. For example, if a valid frame is received through the PHY layer, the PHY layer of the STA can generate a specific primitive (e.g., PHYRxStart.indication primitive) and send the specific primitive to the MAC layer. If the probe delay time expires and a valid frame is received through the PHY layer of the STA, the STA can perform channel access in order to send a probe request frame through a channel. If the STA succeeds in the channel access, the STA can send the probe request frame through the channel.

After sending the probe request frame, the STA can set a probe timer 'probetimer'. The STA can measure a channel state until the probe timer reaches a minimum channel time 'MinChannelTime'. If the channel state is not busy as a result of the measurement, the STA can set an NAV to 0 and scan another channel. If the channel state is busy as a result of the measurement, the STA can receive a probe response frame from the channel until the probe timer reaches a maximum channel time 'MaxChannelTime'. When the probe timer reaches the maximum channel time, the STA can process all received probe response frames. Whether the state of a channel sensed by the STA is busy or not can be determined based on a PHY-CCA.indication primitive generated in the PHY layer of the STA.

Hereinafter, in accordance with an embodiment of the present invention, a method of an STA searching for a channel rapidly in order to perform scanning more rapidly is described.

It is assumed that all channels present in a frequency bandwidth are indicated by a channel #1 to a channel #11. Furthermore, it is assumed that an STA has performed association with a target AP (e.g., a home AP) based on the active scanning in the channel #9. An AP on which the STA will perform scanning or association is defined as a target AP. For example, the target AP can be specified by information (e.g., SSID and/or BSSID information) for specifying an AP included in the MLME-SCAN.request primitive.

The STA can specify the BSSID and SSID of the target AP and unicast a probe request frame. In accordance with an existing scanning procedure, the STA can change a channel in order to search for a target AP based on channel list information included in the MLME-SCAN.request primitive. The channel list is a list of channels that are searched for when the STA scans a BSS.

If it is assumed that the target AP operates in the channel #9 and the STA needs to sequentially perform scanning from the channel #1, the STA can receive a probe response frame from the target AP in the channel #9 only when the STA performs channel scanning from the channel #1 to the channel #9. That is, the time that is taken for the STA to set up an initial link can be delayed because the STA scans a channel in which the target AP is not present.

Hereinafter, in accordance with an embodiment of the present invention, a method of reducing the delay of the time that is taken for an STA to set up an initial link because the STA scans a channel in which a target AP is not present is disclosed below.

In accordance with an embodiment of the present invention, an STA can be configured to preferentially perform scanning on a specific channel when performing scanning. In order for the STA to preferentially perform scanning on a specific channel, the MLME-SCAN.request primitive can include information about a target channel as well as a channel list. The information about a target channel can be information about a channel that is preferentially searched for in order to search for a target AP. The STA can preferentially unicast a probe request frame in the target channel based on the information about a target channel that is included in the MLME-SCAN.request primitive. If this method is used, the target channel can be preferentially scanned without scanning all channels included in the channel list.

Figure 7:
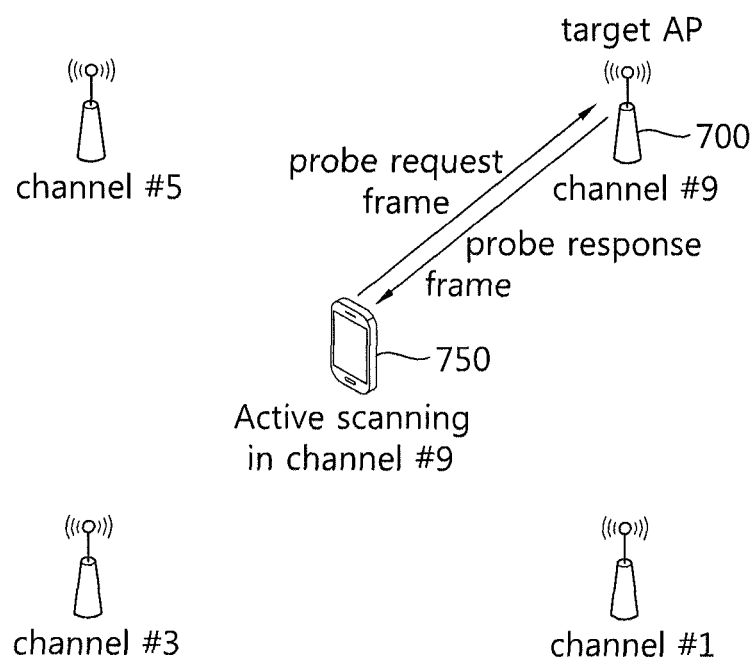
FIG. 7 is a conceptual diagram showing a scanning method of an STA in accordance with an embodiment of the present invention.

FIG. 7 is a conceptual diagram showing a scanning method of an STA in accordance with an embodiment of the present invention.

FIG. 7 shows a method in which an STA 750 preferentially performs active scanning on a target channel specified by the MLME-SCAN.request primitive.

It is assumed that channels defined in a BSS include a channel #1 to a channel #11 and a target AP 700 is present in the channel #9. In this case, the STA 750 can determine a target channel based on information about a channel used in the existing target AP 700 and include the target channel in the MLME-SCAN.request primitive. The MLME-SCAN.request primitive including the target channel can be generated in the SME. A variety of methods in which the STA 750 determines the target channel can be used. For example, if the STA 750 has performed association in the channel #9 when previously performing the association with the target AP 700, the STA 750 can determine the target channel to be the channel #9. That is, the STA 750 can determine information about the target channel to be included in the MLME-SCAN.request primitive based on information about a channel in which the STA 750 has performed association with the target AP 700.

The STA 750 can preferentially send a probe request frame in the target channel (e.g., the channel #9) based on the MLME-SCAN.request primitive. If this method is used, the STA 750 does not need to perform an unnecessary operation of sending a probe request frame in order to search for the target AP 700 in the channel #1 to the channel #8 as in an existing scanning operation.

The target AP 700 may change an operating channel from an existing channel to another channel. In this case, the STA 750 may not scan the target AP 700 through the target channel. In this case, the STA 750 can perform a scanning procedure based on channels included in a channel list. The STA 750 can perform scanning on channels included in the channel list except a channel corresponding to the target channel.

In order for the STA 750 to preferentially perform an active scanning procedure on the target channel, the STA 750 can determine whether or not the target AP 700 is present nearby. If, as a result of the determination, it is determined that the target AP 700 is present, the STA 750 may perform the active scanning procedure in the target channel on which the STA 750 has performed association along with the target AP 700. In order for the STA 750 to determine whether or not the target AP 700 is present nearby, a variety of methods can be used. For example, the current location of the STA 750 can be determined or whether or not the target AP is present in a corresponding location can be determined based on a Global Positioning System (GPS).

The MLME-SCAN.request primitive disclosed in Table 1 can further include information about a target channel. Table 2 below shows information about a target channel that is additionally included.

TABLE 2

| NAME | DESCRIPTION |
| --- | --- |
| Target channel | Specific channel examined when scanning a BSS |

In the above-described embodiment of the present invention, although the case where an STA performs active scanning has been described, information about a target channel that is included in the MLME-SCAN.request primitive can be used in the case where an STA performs passive scanning not active scanning.

Figure 8:
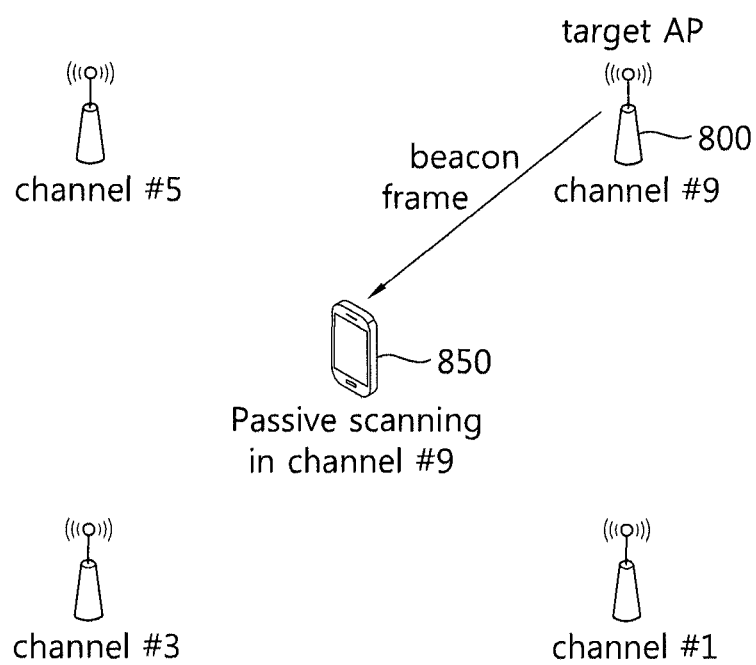
FIG. 8 is a conceptual diagram showing a passive scanning method of an STA in accordance with an embodiment of the present invention.

FIG. 8 is a conceptual diagram showing a passive scanning method of an STA in accordance with an embodiment of the present invention.

Referring to FIG. 8, if a scan type is indicated as passive scanning in the MLME-SCAN.request primitive, an STA 850 can receive a beacon frame or an FILS discovery frame in a channel by way of passive scanning.

In performing the passive scanning, the STA 850 can preferentially receive the beacon frame or the FILS discovery frame in a target channel instructed through the MLME-SCAN.request primitive. If this method is used, the STA 850 can preferentially receive the beacon frame or the FILS discovery frame that is transmitted by a target AP 800. Like in the active scanning, if the STA 850 does not receive the beacon frame transmitted by the target AP 800 in the target channel, the STA 850 can perform scanning in other channels except a channel corresponding to the target channel, from among channels included in a channel list.

In accordance with another embodiment of the present invention, a method of assigning priorities to channels included in a channel list can be used so that the scanning procedure of an STA is rapidly performed.

The channel list included in the MLME-SCAN.request primitive can be configured according to specific priority. The STA can determine a channel on which scanning will be preferentially performed according to the priority of the channel list.

FIG. 9 is a conceptual diagram showing a channel list in accordance with an embodiment of the present invention.

Referring to FIG. 9, in the channel list, scanning priority for the channel number of an AP that has been previously associated can be reconfigured. The scanning priority can be priority of channels on which an STA preferentially perform scanning.

For example, the highest priority in the channel list can be assigned to the channel of an AP that has recently been associated. When the MLME-SCAN.request primitive is generated in the SME, the highest priority in the scanning priority of the channel list can be assigned to the channel (e.g., the channel #9 900) of an AP that has recently been associated. If the highest priority in the scanning priority of a channel list is assigned to the channel of an AP that has recently been associated as described above, the priorities of some (e.g., a channel #1 910 and a channel #3 930) of channels included in the channel list can be configured to have one-step lower priorities.

The method of configuring scanning priority in the channel list is only one example, and other various methods may be used. For example, the highest scanning priority can be assigned to a channel that has been most frequently accessed by an STA based on frequency of channel association, and scanning priorities can be sequentially assigned to the remaining channels based on frequency of access. In accordance with another method, the priority of a channel list can be set based on the time or place. If an STA accesses a specific AP with a specific time pattern or mobile pattern, the scanning priority of a channel list may be determined based on the time pattern or the mobile pattern. The highest scanning priority can be assigned to a channel in which a home AP operates in a first time zone based on information about a pattern in a house in the morning, in a firm in the forenoon and afternoon, and in a house in the evening, and the highest scanning priority can be assigned to a channel in which an AP in a firm operates in a second time zone.

When a target AP is searched for, an STA can place an MLME-SCAN.stop primitive at the top of the STA and stop the scanning procedure. The MLME-SCAN.stop primitive can be a primitive that stops the STA from performing an AP scanning procedure in a channel.

Figure 10:
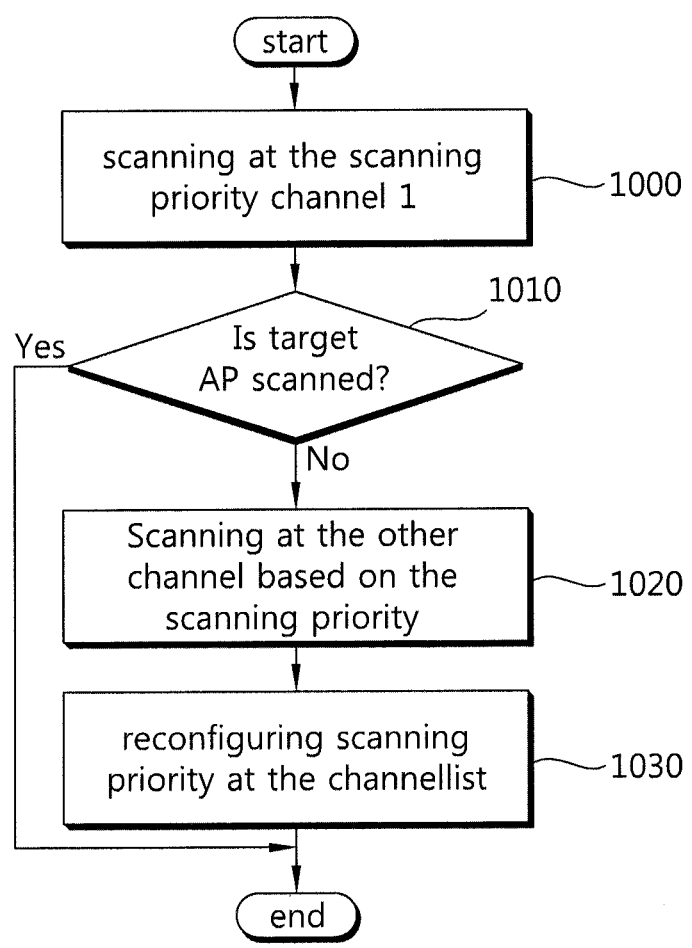
FIG. 10 is a flowchart illustrating a scanning method in accordance with an embodiment of the present invention.

FIG. 10 is a flowchart illustrating a scanning method in accordance with an embodiment of the present invention.

FIG. 10 shows a procedure in which an STA scans a target AP.

Referring to FIG. 10, the STA preferentially performs scanning on a channel corresponding to first scanning priority, from among channels included in a channel list at step S1000.

The channel list can include information about scanning priority that has been determined according to various methods. For example, the scanning priority can be configured based on information about the channel of an AP that has been accessed by previously performing scanning. In the scanning priority of the channel list, the first scanning priority can be assigned to the operating channel of an AP that has been associated most recently, and the second scanning priority can be assigned to the operating channel of an AP that has been previously associated. The STA can perform scanning according to the scanning priorities of channels included in the channel list. A case where the operating channel of an AP that has recently been associated is set as a first scanning priority channel is disclosed below.

The STA determines whether or not a target AP has been scanned in a channel corresponding to the first scanning priority of the channel list at step S1010.

If, as a result of the determination, it is determined that a target AP has been scanned in a channel corresponding to the first scanning priority of the channel list, the STA can terminate the scanning procedure. If, as a result of the determination, it is determined that a target AP has not been scanned in a channel corresponding to the first scanning priority of the channel list, the STA can search for a target AP by sequentially scanning channels included in the channel list according to the priorities of the channels at step S1020.

The STA can search for a target AP by sequentially performing scanning on the channels according to the priorities of the channels on the basis of scanning priority information.

If a target AP is searched for, the STA reconfigures the scanning priorities of the channels included in the channel list at step S1030.

The first scanning priority of the channel list is assigned to the operating channel of the target AP. If a target AP is searched for, the STA can assign the first scanning priority of the channel list to the operating channel of the target AP. Priority of an existing channel assigned with the first scanning priority of the channel list can be changed to the second scanning priority. The priorities of the remaining channels can be newly configured depending on the location of the operating channel of the target AP in the existing channel list.

In accordance with another embodiment of the present invention, an STA can change a scan type and perform scanning.

An existing STA has determined a scan type for AP discovery according to scan type information included in the MLME-SCAN.request primitive. The existing STA performs scanning according to the determined scan type, but cannot dynamically change a scan type based on channel state information.

Hereinafter, in accordance with an embodiment of the present invention, a method in which an STA dynamically changes a scan type according to a channel state (e.g., whether a corresponding channel is congested or not) and searches for an AP is disclosed.

For example, an STA can determine whether to perform active scanning or passive scanning for AP discovery based on a channel congestion indicator that has been received from an AP. Furthermore, the STA can change scan type information included in the MLME-SCAN.request primitive through the MLME-SCAN.change primitive based on the channel congestion indicator.

Figure 11:
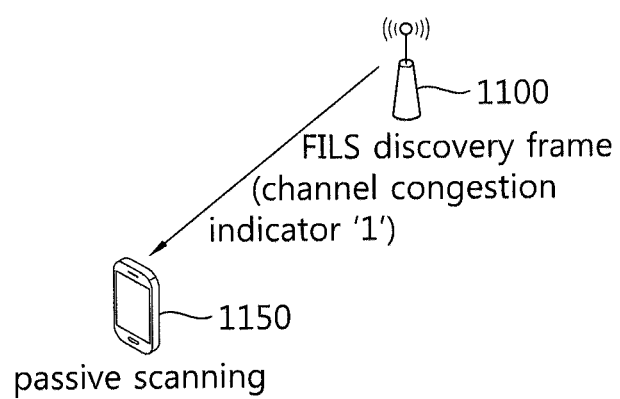
FIG. 11 is a conceptual diagram showing a channel scanning method of an AP in accordance with an embodiment of the present invention.

FIG. 11 is a conceptual diagram showing a channel scanning method of an AP in accordance with an embodiment of the present invention.

Referring to FIG. 11, the AP 1100 can measure channel state information in order to determine information about a channel congestion indicator. For example, the AP 1100 can periodically measure a channel congestion level. The AP 1100 can use the following method in order to measure the channel congestion level. For example, the AP 1100 can measure the channel congestion level by counting the number of probe request frames received from an STA 1150 for a specific period. Furthermore, the AP 1100 can measure information about the channel congestion level by counting the number of probe request frames retransmitted by the STA 1150 for a specific period or can measure information about the channel congestion level by counting the number of probe response frames retransmitted by the AP 1100 for a specific period. If the AP 1100 determines that a corresponding channel is congested based on a result of the measured channel state, the AP 1100 can set the channel congestion indicator to a specific value and send the channel congestion indicator to the STA 1150. The channel congestion indicator can be included in a beacon frame, an FILS discovery frame, or a broadcasted probe response frame. The AP 1100 can indicate that the transmission of a probe request frame by the STA 1150 is not allowed based on the channel congestion indicator that is included in the beacon frame, the FILS discovery frame, or the broadcasted probe response frame.

FIG. 11 illustrates a method in which the AP 1100 sets the channel congestion indicator to 1in an FILS discovery frame and sends the FILS discovery frame.

Furthermore, the AP 1100 can further include time interval information in the beacon frame, the FILS discovery frame, or the broadcasted probe response frame and send the beacon frame, the FILS discovery frame, or the broadcasted probe response frame to the STA 1150. The time interval information can include information about the time during which the STA 1150 is not allowed to send a probe request frame. The STA 1150 may not perform active scanning in which the probe request frame is transmitted for a specific time based on the received time interval information.

If the AP 1100 determines that a corresponding channel is not congested based on a result of the measured channel state, the AP 1100 can set a channel congestion indicator to a specific value and send the channel congestion indicator to the STA 1150. The AP 1100 can indicate that the STA 1150 is allowed to send a probe request frame based on the channel congestion indicator that is included in a beacon frame, an FILS discovery frame, or a broadcasted probe response frame.

The STA 1150 can determine a scan type based on the channel congestion indicator received from the AP 1100. Furthermore, the STA 1150 may change a current scan type to another scan type that has been determined based on the channel congestion indicator. Prior to active scanning, the STA 1150 can obtain information about whether a corresponding channel is congested or not from the AP 1100 during probe delay. For example, the STA 1150 can obtain information about a current channel state based on a channel congestion indicator indicated by the AP 1100 in a beacon frame, an FILS discovery frame, or a broadcasted probe response frame. The STA 1150 can determine whether to perform active scanning or passive scanning based on the obtained information about a channel state.

If a scan type is determined to be an active type based on the MLME-SCAN.request primitive and the STA 1150 performs active scanning, the STA 1150 can monitor channels for a probe delay interval. The STA 1150 can receive a channel congestion indicator, indicating that a corresponding channel is congested, through a beacon frame, an FILS discovery frame, or a broadcasted probe response frame for the probe delay interval. In this case, in accordance with an embodiment of the present invention, the STA 1150 can change a scan type from an active type to a passive type. Furthermore, if active scanning fails (e.g., if the STA 1150 does not receive a probe response frame after sending a probe request frame), the STA 1150 may perform passive scanning without performing active scanning.

In contrast, if the channel congestion indicator received by the STA 1150 through the AP 1100 indicates that a corresponding channel is not congested, the STA 1150 can perform active scanning by sending a probe request frame without changing a scanning method. If this method is used, in a channel having a congested channel state, the STA 1150 can change a scan type from active scanning to passive scanning and perform scanning.

The channel congestion indicator in accordance with an embodiment of the present invention can be defined as in Table 3 below. The channel congestion indicator can be transmitted to an STA through a beacon frame, an FILS discovery frame, or a broadcasted probe response frame.

TABLE 3

| VALUE | NOTE |
|---|---|
| 0 | A channel is not congested. An STA is allowed to perform active scanning for AP discovery. |
| 1 | A channel is congested. An STA is not allowed to perform active scanning. Instead, the STA may perform passvive scanning. |
| 2~7 | Reserved |

Referring to Table 3, if the scan type of the MLME-SCAN.request primitive is configured to be active and the channel congestion indicator of a frame received for a probe delay interval is set to 0, an STA can perform active scanning.

In contrast, if the scan type of the MLME-SCAN.request primitive is configured to be active and the channel congestion indicator of a frame received for a probe delay interval is set to 1, an STA can perform passive scanning not active scanning.

Figure 12:
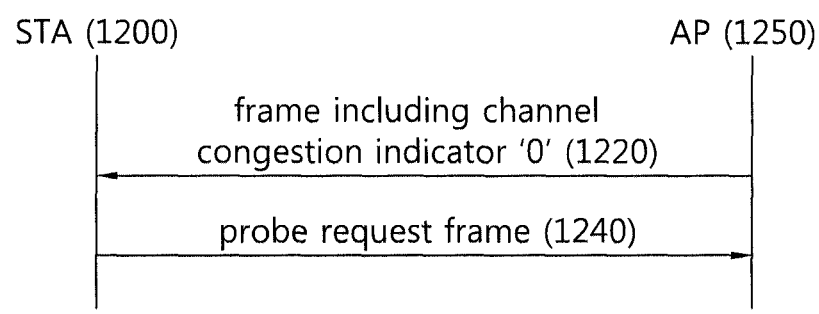
FIG. 12 is a conceptual diagram showing an AP discovery process of an STA in accordance with an embodiment of the present invention.

FIG. 12 is a conceptual diagram showing an AP discovery process of an STA in accordance with an embodiment of the present invention.

FIG. 12 illustrates a case where a channel congestion indicator transmitted by an AP 1250 indicates that a channel is not congested.

Referring to FIG. 12, an STA 1200 can receive a frame 1220, indicating that a channel congestion indicator is 0, through a frame, such as a beacon frame, an FILS discovery frame, or a broadcasted probe response frame transmitted by the AP 1250.

If the STA 1200 receives the frame 1220 indicating that the channel congestion indicator is 0, the STA 1200 can determine its scan type to be active scanning and send a probe request frame 1240 to the AP 1250.

Even after the STA 1200 has determined a scan type to be passive scanning, the STA 1200 can receive the frame 1220 indicating that the channel congestion indicator is 0 and change a scan type. It may be assumed that the STA 1200 determines a scan type to be a passive scan type based on the MLME-SCAN.request primitive and the STA 1200 receives the frame indicating that the channel congestion indicator is 0. In this case, the STA 1200 can change the scan type of the MLME-SCAN.request primitive from passive scanning to active scanning. After a probe delay interval, the STA 1200 can search for the AP 1250 by performing active scanning in which the probe request frame 1240 is transmitted. A method of the STA 1200 changing a scan type is described below in connection with an embodiment of the present invention.

Figure 13:
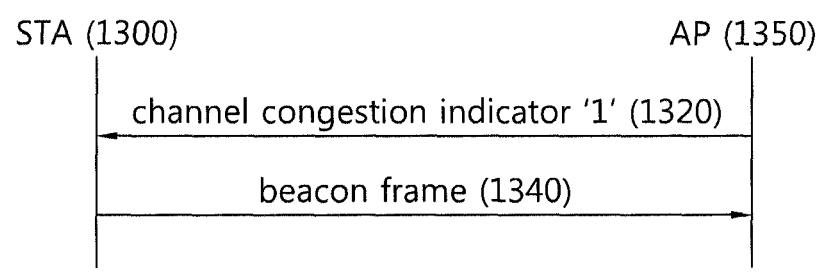
FIG. 13 is a conceptual diagram showing an AP discovery process of an STA in accordance with an embodiment of the present invention.

FIG. 13 is a conceptual diagram showing an AP discovery process of an STA in accordance with an embodiment of the present invention.

FIG. 13 illustrates a case where a channel congestion indicator transmitted by an AP indicates that a corresponding channel is congested.

Referring to FIG. 13, an STA 1300 can receive a frame 1320, indicating that a channel congestion indicator is 1, through a frame, such as a beacon frame, an FILS discovery frame, or a broadcasted probe response frame that is transmitted by an AP 1350.

If the STA 1300 receives the frame 1320 indicating that the channel congestion indicator is 1, the STA 1300 can determine its scan type to be passive scanning and receive a beacon frame or an FILS discovery frame. For example, if the STA 1300 receives the frame 1320 indicating that the channel congestion indicator is 1, the STA 1300 can determine its scan type to be a passive scan type based on the MLME-SCAN.request primitive and receive a beacon frame 1340 transmitted by the AP 1350.

Furthermore, it may be assumed that the scan type of the STA 1300 is configured to be active scanning and the STA 1300 receives the frame 1320 indicating that the channel congestion indicator is 1 during probe delay. In this case, the STA 1300 can change the scan type of the MLME-SCAN.request primitive from active scanning to passive scanning. The STA 1300 can receive the beacon frame 1340 without sending a probe request frame to the AP 1350 based on the changed scan type.

Figure 14:
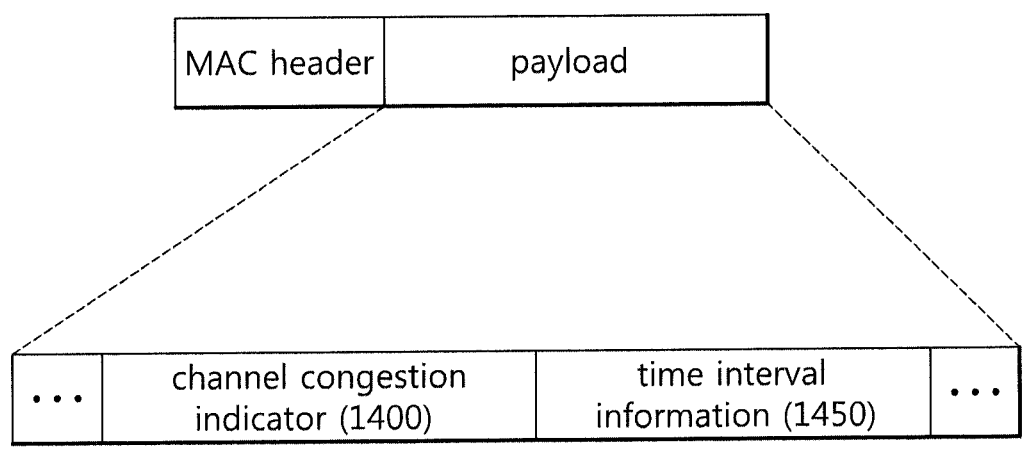
FIG. 14 is a conceptual diagram showing a frame in accordance with an embodiment of the present invention.

FIG. 14 is a conceptual diagram showing a frame in accordance with an embodiment of the present invention.

FIG. 14 shows a frame including a channel congestion indicator 1400 and time interval information 1450. The frame including the channel congestion indicator 1400 and the time interval information 1450 can be an FILS discovery frame, a beacon frame, or a probe response frame.

The channel congestion indicator 1400 can include information about a channel state measured by an AP as in Table 3 above. The AP can measure a channel congestion state and determine a channel congestion indicator based on a result of the measurement.

If the channel congestion indicator 1400 indicates that a corresponding channel is congested, the time interval information 1450 can include information about the time during which an STA is not allowed to perform active scanning. The STA may not perform active scanning on a channel during the time based on the time interval information.

Figure 15:
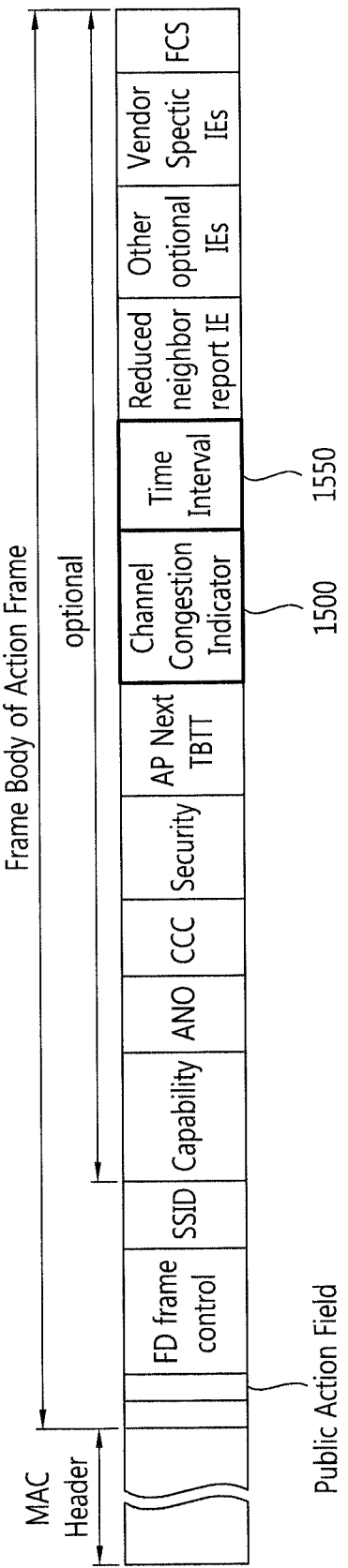
FIG. 15 is a conceptual diagram showing a frame indicative of channel congestion information in accordance with an embodiment of the present invention.
Figure 16:
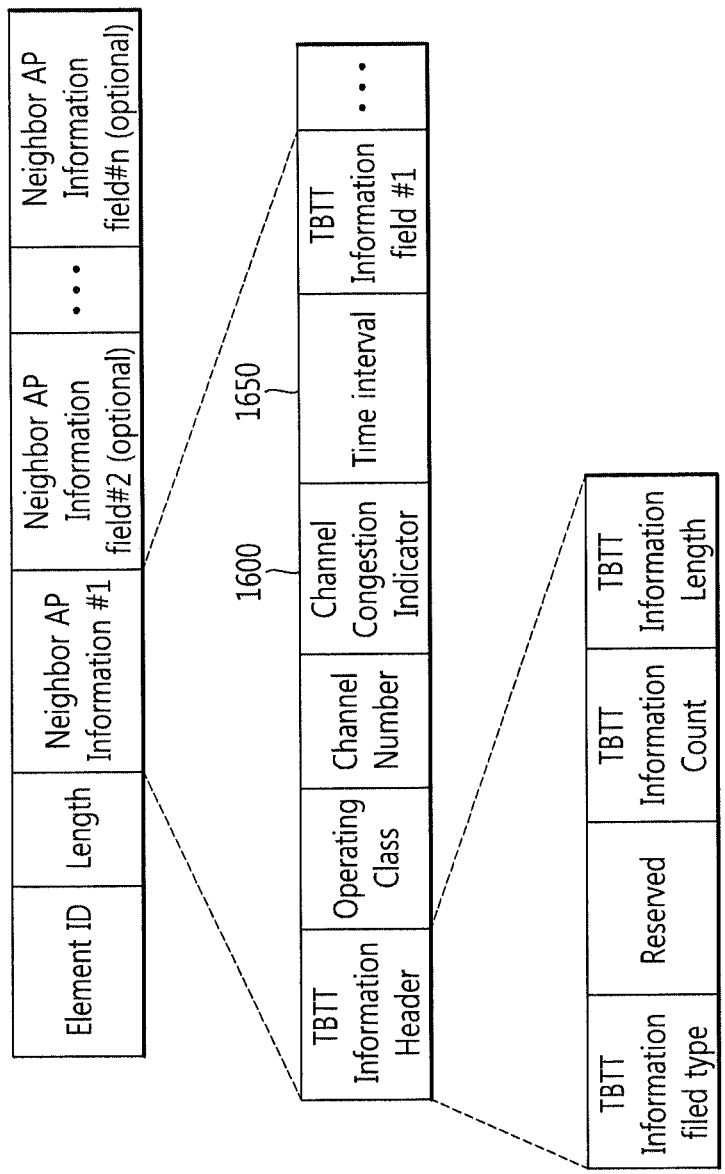
FIG. 16 is a conceptual diagram showing a frame in accordance with an embodiment of the present invention.
Figure 17:
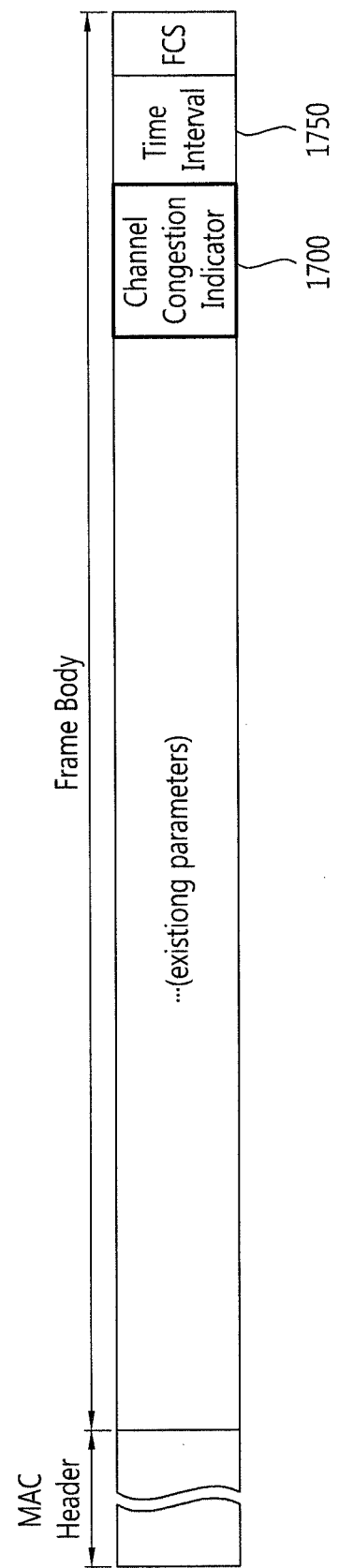
FIG. 17 is a conceptual diagram showing a frame in accordance with an embodiment of the present invention.

The channel congestion indicator 1400 and the time interval information 1450 can be included in a frame in various formats. FIGS. 15 to 17 illustrate various frame formats each including the channel congestion indicator and the time interval information.

FIG. 15 is a conceptual diagram showing a frame indicating whether a channel is congested or not in accordance with an embodiment of the present invention.

FIG. 15 illustrates a case where a channel congestion indicator and time interval information are included in an FILS discovery frame.

The FILS discovery frame can include fields, such as a category, a public action, FD frame control, an SSID, capability, Access Network Options (ANO), a Configuration Change Count (CCC), security, AP Next TBTT Offset (ANTO), a channel congestion indicator 1500, a time interval 1550, a reduced neighbor report IE, other optional IEs, vendor specific IEs, and a Frame Check Sequence (FCS).

The category can be used to indicate information about a public category.

The public action can be used to indicate the FILS discovery frame.

The FD frame control can include information about the length of an SSID and an indicator field for indicating whether or not other fields included in the FILS discovery frame are present.

The SSID can include information about the identifier of an AP.

The capability can include information about an operating channel bandwidth, information about the number of spatial streams, and information about a supported minimum rate.

The ANO can include information about an access network type.

A version number of a parameter set value set by an AP can be set in the CCC.

The security can include information related to security.

The ANTO can include information about a time offset between the time when an FILS discovery frame is transmitted and the time when a beacon frame is transmitted.

The channel congestion indicator 1500 can include information about a channel state measured by an AP as in Table 3. The AP can measure a channel congestion state and determine the channel congestion indicator based on a result of the measurement.

If the channel congestion indicator indicates that a corresponding channel is congested, the time interval 1550 can include information about the time during which an STA is not allowed to perform active scanning.

The reduced neighbor report IE can include information about a neighbor AP.

The other optional IEs are selectively included in the FILS discovery frame.

The vendor specific IEs are additionally included in the FILS discovery frame depending on a service provider.

The FCS can include information for checking an error in a received frame.

FIG. 16 is a conceptual diagram showing a frame in accordance with an embodiment of the present invention.

FIG. 16 illustrates a case where a channel congestion indicator and time interval information are included in the reduced neighbor report field of an FILS discovery frame.

Referring to FIG. 16, an element ID can include information for indicating the reduced neighbor information field.

A length can include information about the length of the reduced neighbor information field.

Neighbor AP information can include information related to a neighbor AP.

The neighbor AP information can include a TBTT information header, an operating class, a channel number, a channel congestion indicator 1600, a time interval 1650, and a TBTT information field.

The TBTT information header can include a TBTT information field type, a TBTT information count, and a TBTT information length. The structure of a TBTT information field type TBTT information field can be defined. For example, if the TBTT information field type is 0, it can indicate the existence of informative neighbor AP information. The informative neighbor AP information can be information for assisting the AP discovery of an STA. If the TBTT information field type is 1, it can indicate the existence of recoordination neighbor AP information (or neighbor AP). The reco-ordination neighbor AP information (or neighbor AP) can be used for an STA to change an AP for performing a scanning procedure to another AP.

Furthermore, when the TBTT information field type is 1, assuming that the channel and band of an AP that has sent a reduced neighbor report element are a current operating channel and a current operating band, another AP can be used to change into another AP of the current operating channel, an AP in a channel different from the current operating channel, or an AP having a different band from the current operating band. That is, the TBTT information field type having a value of 1 can be used to change an STA into another band, another channel, or another STA indicated in the neighbor AP information field. The TBTT information field type may also be called a type field.

The TBTT information count can include information about the number of TBTT information fields included in the neighbor AP information field. If the TBTT information count is 0, it can indicate that a TBTT information field is not present in the neighbor AP information field. If the TBTT information field type is 0, the TBTT information count may not be 0. For another example, the TBTT information field type may have a value other than 0.

The TBTT information length can include information about the length of a TBTT information field having an octet unit which is included in the neighbor AP information field. In accordance with an embodiment of the present invention, an STA can recoordinate APs based on the TBTT information field. The TBTT information length may also be called a length field.

The operating class can include information about a bandwidth and band of the primary channel of a neighbor AP.

The channel number can include information about a bandwidth and band of the primary channel of a neighbor AP.

The channel congestion indicator 1600 can include information about a channel state measured by an AP, such as that of Table 3.

The time interval 1650 can include information about the time during which the active scanning of an STA is limited.

The TBTT information field can include information about a TBTT offset and a BSSID. The TBTT offset can include information about an offset until a next TBTT of an AP that has sent this element. If a value of the TBTT offset is 254, it can indicate an offset of a 254 TU or an offset having a greater value. A value 255 of the TBTT offset can be used to indicate an unknown offset value.

The BSSID can include information about the identifier of an AP which will be recoordinated by an STA and on which scanning will be performed by the STA.

In accordance with an embodiment of the present invention, information about a channel congestion state that is indicated in the channel number of the neighbor AP information field can be informed through the channel congestion indicator. Furthermore, if the channel congestion indicator is 1, time interval information can be included in the neighbor AP information field and transmitted.

FIG. 17 is a conceptual diagram showing a frame in accordance with an embodiment of the present invention.

FIG. 17 shows a case where a channel congestion indicator and time interval information are included in the channel congestion indicator of a beacon frame.

Like in FIGS. 15 and 16, a channel congestion indicator 1700 can include information about a channel state measured by an AP, such as that of Table 3. A time interval 1750 can include information about the time during which the active scanning of an STA is limited.

Figure 18:
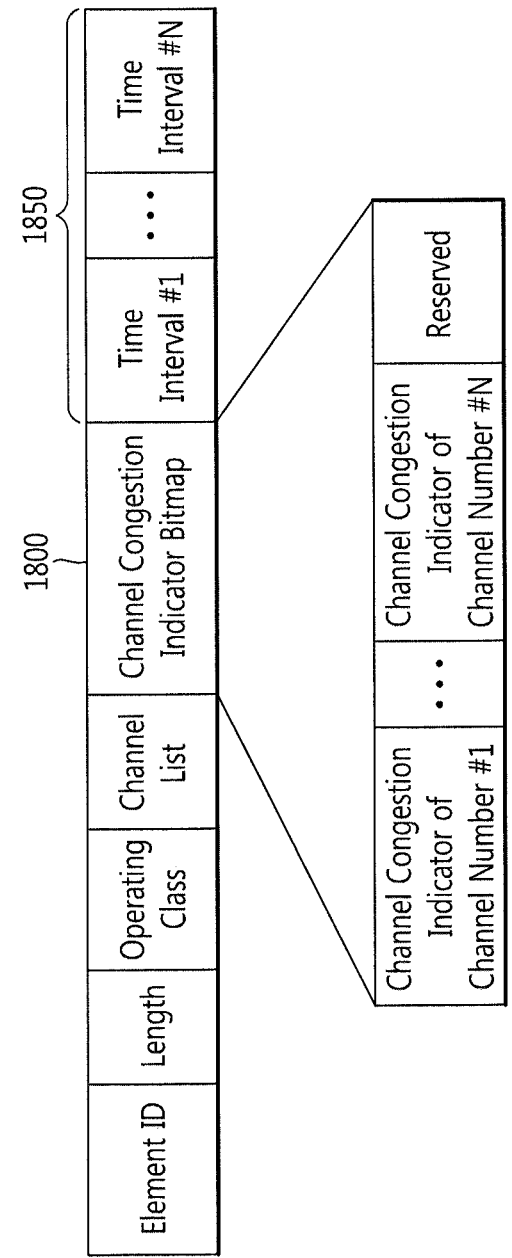
FIG. 18 is a conceptual diagram showing a frame in accordance with an embodiment of the present invention.

FIG. 18 is a conceptual diagram showing a frame in accordance with an embodiment of the present invention.

FIG. 18 shows a case where a channel congestion indicator and time interval information are included in the channel congestion indicator of a beacon frame.

A beacon frame or a probe response frame can include an AP channel report element. Referring to FIG. 18, the AP channel report element can include a channel congestion indicator bitmap 1800. In accordance with an embodiment of the present invention, channel state information about a plurality of channels can be transferred to an STA based on the channel congestion indicator bitmap.

For example, the size of the channel congestion indicator bitmap 1800 can be equal to the number of channel numbers in a channel list. The channel congestion indicator bitmap 1800 can have the same order as a channel number in a channel list. That is, an AP can send congestion state information about a channel, reported by the AP, to an STA through the AP channel report element. Time interval information 1850 according to a channel can be included in the frame based on congestion state information about the channel and then transmitted. The time interval information 1850 can be transmitted in relation to a channel indicated by a channel congestion indicator indicating that the channel is congested.

In accordance with an embodiment of the present invention, an MLME-SCAN.change primitive can be newly defined. The MLME-SCAN.change primitive can be used to change specific information included in an MLME-SCAN.request primitive when an STA performs a scanning procedure.

If a channel state is congested as described above or for other reasons, an STA can determine to perform AP discovery according to another scan type not a scan type instructed through the MLME-SCAN.request primitive. In this case, the STA can use the MLME-SCAN.change primitive to inform that a scan type has been changed. As described above, information included in the MLME-SCAN.request primitive can be changed based on the MLME-SCAN.change primitive.

The MLME-SCAN.change primitive can include at least one piece of changed information, from among pieces of information included in the MLME-SCAN.request primitive. For example, a scan type instructed through the MLME-SCAN.request primitive is active scanning, but can be changed into passive scanning due to the congestion of a channel. In this case, an STA can generate the MLME-SCAN.change primitive including only information about the scan type. Alternatively, a changed scan type, that is, information about the changed scan type, and the scan type can be included in the MLME-SCAN.change primitive and transmitted.

Alternatively, if an STA wants to change only a minimum channel time 'MinChannelTime' and a maximum channel time 'MaxChannelTime', the MLME-SCAN.change primitive including only the minimum channel time and the maximum channel time can be generated.

Information included in the MLME-SCAN.change primitive can be changed when an STA performs scanning. For example, the MLME-SCAN.change primitive can include pieces of information, such as a BSS type 'BSSType', BSSID, SSID, a scan type 'ScanType', a changed scan type 'changed scan type', probe delay 'ProbeDelay', a channel list 'ChannelList', a minimum channel time 'MinChannelTime', a maximum channel time 'MaxChannelTime', request information 'RequestInformation', an SSID list 'SSID List', channel usage 'ChannelUsage', an access network type 'AccessNetworkType', HESSID, MeshID, and VendorSpecificInfo. Information included in the MLME-SCAN.change primitive can be included in the MLME-SCAN.change primitive and transmitted if information changed when scanning is performed is present. Each piece of information included in the MLME-SCAN.change primitive can be used to indicate information, such as that listed in Table 1.

Figure 19:
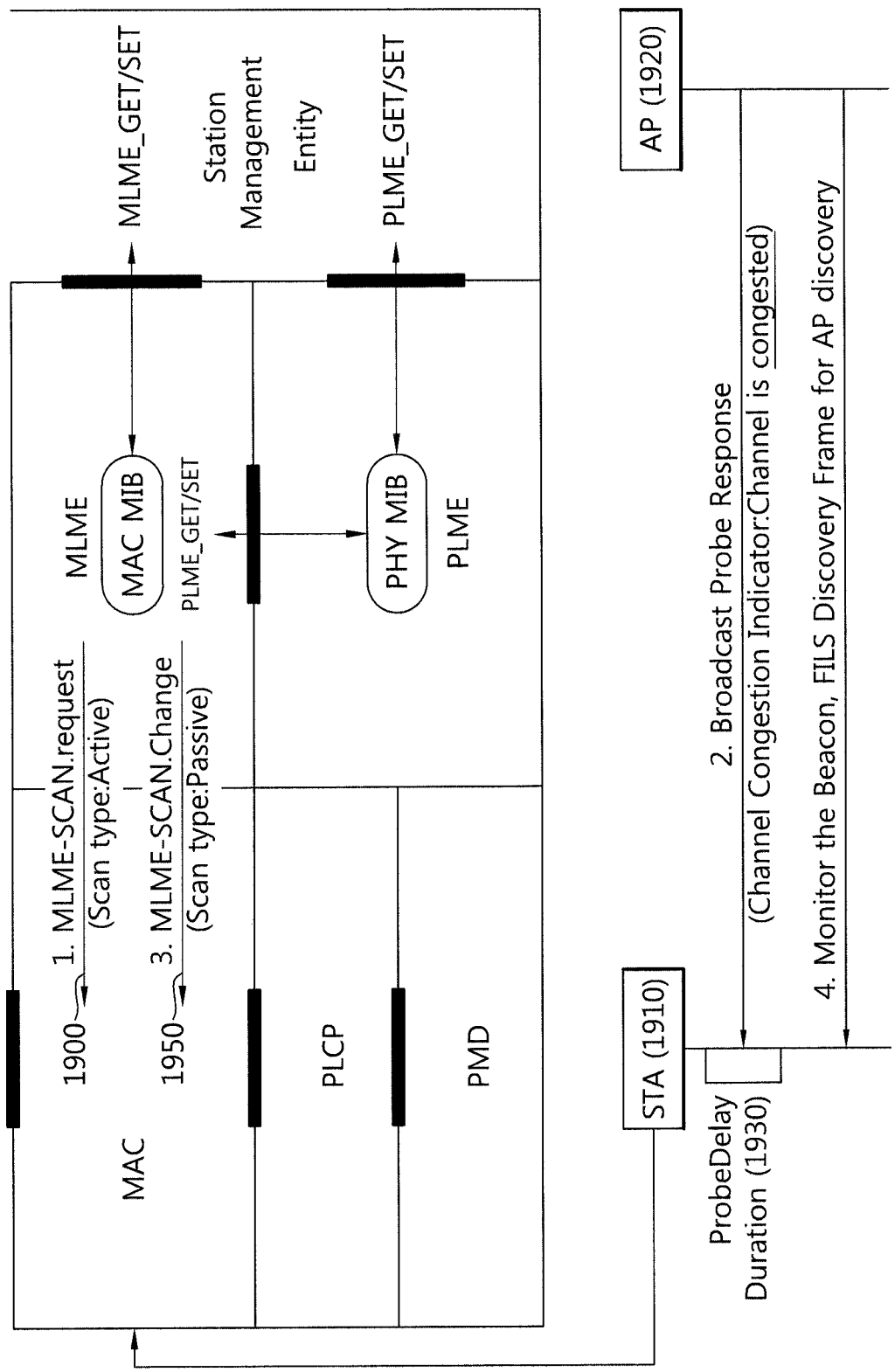
FIG. 19 is a conceptual diagram showing a method of changing a scan type through an MLME-SCAN.change primitive in accordance with an embodiment of the present invention.

FIG. 19 is a conceptual diagram showing a method of changing a scan type through the MLME-SCAN.change primitive in accordance with an embodiment of the present invention.

Referring to FIG. 19, an STA 1910 can be instructed to change its scan type into active scanning through an MLME-SCAN.request primitive 1900 that is transmitted from the MLME to the MAC. If the STA 1910 performs active scanning, that is, the scan type instructed based on the MLME-SCAN.request primitive 1900, the STA 1910 can monitor a channel during probe delay 1930. During the probe delay 1930, the STA 1910 can receive information about a channel congestion indicator through a beacon frame, an FILS discovery frame, or a probe response frame that has been transmitted by an AP 1920. The AP 1920 can be another AP other than a target AP to which the STA 1910 sends a probe request frame.

If the received channel congestion indicator indicates that the channel is congested, the STA 1910 can change a scan type from active scanning to passive scanning. In order to change the scan type of the STA 1910 from active scanning to passive scanning, the MLME can generate an MLME-SCAN.change primitive 1950 and send the MLME-SCAN.change primitive 1950 to the MAC. The MLME-SCAN.change primitive 1950 can include information about the changed scan type.

When the MLME-SCAN.change primitive 1950 including the changed scan type is received, the STA 1910 can change the scan type into passive scanning and monitor a beacon frame or an FILS discovery frame or both transmitted by a target AP.

Figure 20:
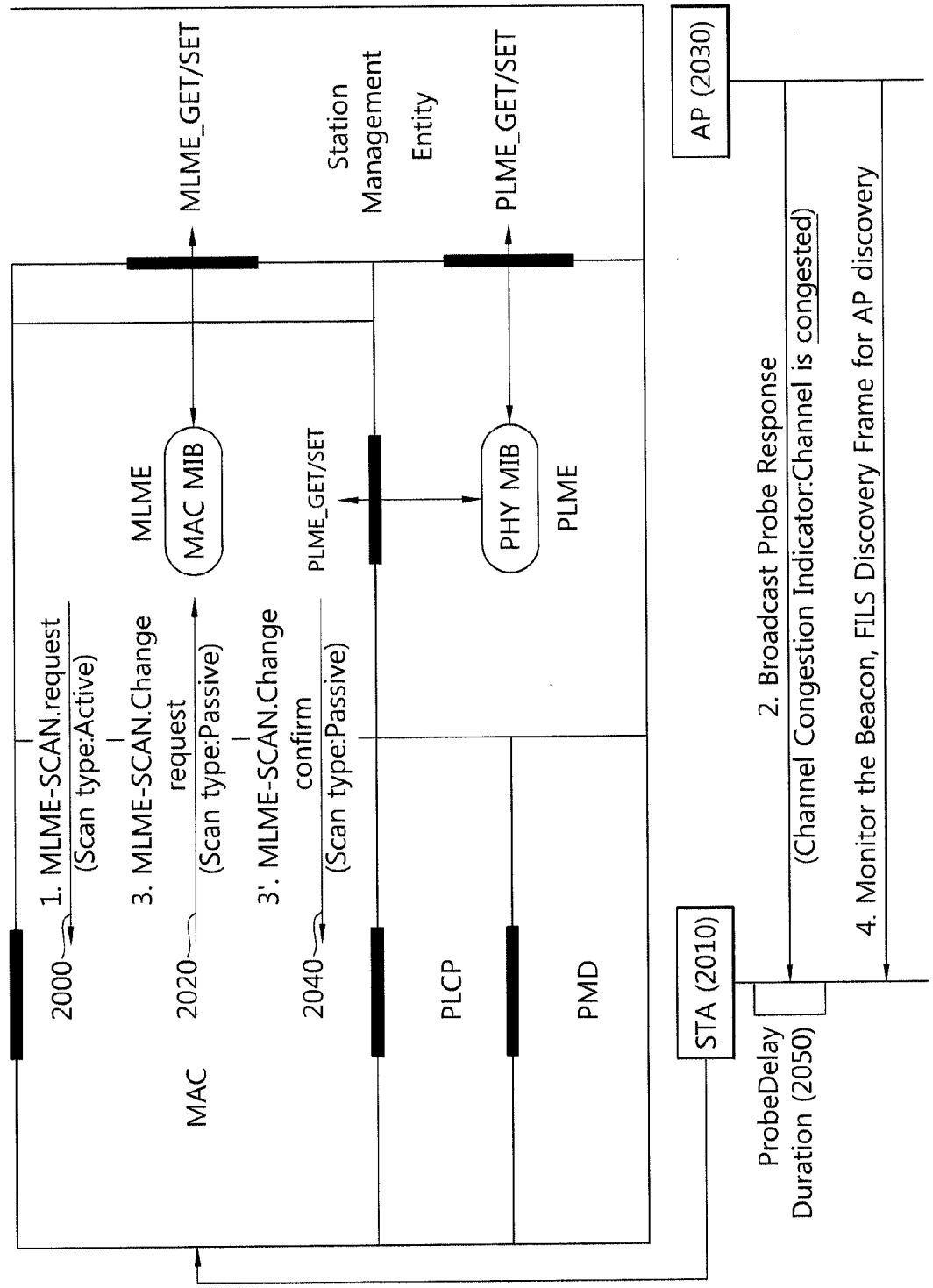
FIG. 20 is a conceptual diagram showing a method of changing a scan type through an MLME-SCAN.change primitive in accordance with an embodiment of the present invention.

FIG. 20 is a conceptual diagram showing a method of changing a scan type through the MLME-SCAN.change primitive in accordance with an embodiment of the present invention.

Referring to FIG. 20, an STA 2010 can be instructed to change its scan type into active scanning through an MLME-SCAN.request primitive 2000.

The STA 2010 can monitor a channel during probe delay 2050 in which active scanning is performed according to the scan type instructed through the MLME-SCAN.request primitive 2000.

The STA 2010 can receive information about a channel congestion indicator through a beacon frame, an FILS discovery frame, or a probe response frame transmitted by an AP 2030, during the probe delay 2050. The AP 2030 can be another AP not a target AP to which the STA 2010 sends a probe request frame.

If the received channel congestion indicator indicates that the channel is congested, the STA 2010 can generate an MLME-SCAN.change request primitive 2020. For example, if the received channel congestion indicator indicates that the channel is congested, the STA 2010 can generate the MLME-SCAN.change request primitive 2020 in which the scan type has been changed from active scanning to passive scanning and inform the MLME of the MLME-SCAN.change request primitive 2020. The MLME-SCAN.change request primitive 2020 can be a parameter that is used to change information included in the MLME-SCAN.request primitive 2000. The MLME-SCAN.change request primitive 2020 can be generated in the MAC and transmitted to the MLME.

The STA 2010 can generate an MLME-SCAN.change confirm primitive 2040 in response to the MLME-SCAN.change request primitive 2020. In response to the MLME-SCAN.change request primitive 2020, the STA 2010 can generate the MLME-SCAN.change confirm primitive 2040 in which the scan type has been changed from active scanning to passive scanning, and the MLME can inform the MAC of the generated MLME-SCAN.change confirm primitive 2040.

If the MLME-SCAN.change confirm primitive 2040 including a changed scan type (e.g., passive scanning) is received from a higher stage, the STA 2010 can perform passive scanning without performing active scanning. The STA 2010 does not send a probe request frame and monitors a beacon frame and an FILS discovery frame transmitted by a target AP.

Figure 21:
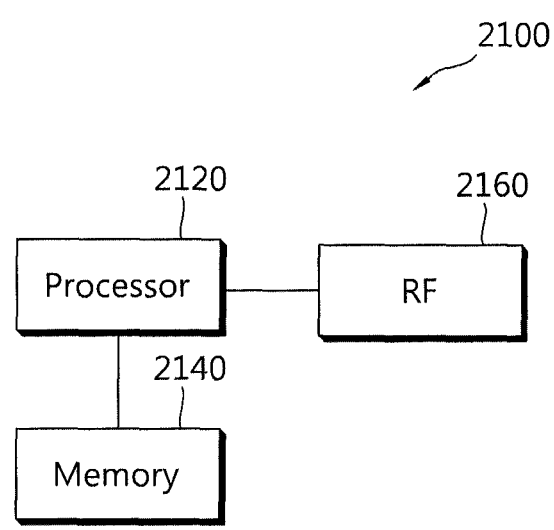
FIG. 21 is a block diagram of a wireless apparatus to which an embodiment of the present invention can be applied.

FIG. 21 is a block diagram of a wireless apparatus to which an embodiment of the present invention can be applied.

Referring to FIG. 21, the wireless apparatus 2100 is an STA capable of implementing the above-described embodiments and can be an AP or a non-AP STA.

The wireless apparatus 2100 includes a processor 2120, memory 2140, and a Radio Frequency (RF) unit 2160.

The RF unit 2160 is connected to the processor 2120 and configured to transmit and receive radio signals.

The processor 2120 implements the functions, processes, methods or all of them proposed by the present invention. For example, the processor 2120 can be implemented to perform the operations of the wireless apparatus in accordance with the embodiments of the present invention.

For example, if the wireless apparatus is an AP, the processor 2120 can generate a frame, including a channel congestion indicator or time interval information or both, and send the frame to an STA. The channel congestion indicator includes information about whether a channel is congested or not. The information about whether a channel is congested or not can be generated by an AP according to various methods.

Furthermore, if the wireless apparatus is an STA, when an MLME-SCAN.request primitive instructs active scanning, the processor 2120 can be implemented to monitor a channel during probe delay and receive a frame. If the STA receives a frame (e.g., a beacon frame, an FILS discovery frame, or a broadcasted probe response frame) indicating that a channel is congested for a probe delay interval, the processor 2120 can be implemented to generate an MLME-SCAN.change request primitive and request a scan type to be changed. Furthermore, the processor 2120 can generate an MLME-SCAN.change confirm primitive as a response to the MLME-SCAN.change request primitive and check a change of the scan type based on the generated MLME-SCAN.change confirm primitive. The processor 2120 can perform passive scanning based on the MLME-SCAN.change confirm primitive in which a change of the scan type has been checked.

The processor 2120 can include Application-Specific Integrated Circuits (ASIC), other chipsets, logic circuits, data processors, converters for mutually converting baseband signals and radio signals or all of them. The memory 2140 can include Read-Only Memory (ROM), Random Access Memory (RAM), flash memory, a memory card, a storage medium, other card devices or all of them. The RF unit 2160 can include one or more antennas for receiving transmitting and receiving radio signals.

When an embodiment is implemented in software, the above-described scheme can be implemented in a module (or process or function) for performing the above-described functions. The module can be stored in the memory 2140 and executed by the processor 2120. The memory 2140 can be placed inside or outside the processor 2120 and coupled with the processor 2120 by way of well-known means.

A scanning procedure can be performed rapidly.

What is claimed is:

1. A method of a scanning of a station (STA), the method comprising:
   monitoring a channel during a probedelay based on a MAC sublayer management entity (MLME)-SCAN.request primitive indicating an active scanning for a target Access Point (AP);
   receiving a frame including a channel congestion indicator from an AP during the probedelay;
   generating a MLME-SCAN.change request primitive to request a change of a scanning type parameter included in the MLME-SCAN.request primitive when the channel congestion indicator indicates that the channel is congested;
   generating a MLME-SCAN.change confirm primitive to confirm the change of the scanning type parameter included in the MLME-SCAN.request primitive as a response of the MLME-SCAN.change request primitive; and
   performing a passive scanning for the target AP based on the MLME-SCAN.change confirm primitive.

2. The method of claim 1, wherein the frame is a Fast Initial Link Setup (FILS) discovery frame, a beacon frame, or a broadcasted probe response frame.

3. The method of claim 1, wherein:
   the channel congestion indicator indicates that the channel is not congested when the value of the channel congestion indicator is 0, and
   the channel congestion indicator indicates that the channel is congested when the value of the channel congestion indicator indicates is 1.

4. The method of claim 1, wherein:
   the frame further includes a time interval when the channel congestion indicator indicates that the channel is congested, and
   wherein the time interval includes information on a duration while which the STA is prohibited from transmitting a probe request frame for the active scanning.

5. The method of claim 1, wherein:
   the MLME-SCAN.change request primitive includes a changed scan type, and the changed scan type indicates a passive scanning.

6. The method of claim 1, wherein the channel congestion indicator includes a bitmap indicating each congestion status of a plurality of channels in channel list.

7. A station (STA) for a wireless local area network, the STA comprising:
   a radio frequency unit configured to receive and transmit radio signal; and
   a processor operatively coupled with the RF unit and configured to:
   monitor a channel during a probedelay based on a MAC sublayer management entity (MLME)--SCAN.request primitive indicating an active scanning for a target Access Point (AP);
   receive a frame including a channel congestion indicator from an AP during the probedelay;
   generate a MLME-SCAN.change request primitive to request a change of a scanning type parameter included in the MLME-SCAN.request primitive when the channel congestion indicator indicates that the channel is congested;
   generate a MLME-SCAN.change confirm primitive to confirm the change of the scanning type parameter included in the MLME-SCAN.request primitive as a response of the MLME-SCAN.change request primitive; and
   perform a passive scanning for the target AP based on the MLME-SCAN.change confirm primitive.

8. The STA of claim 7, wherein the frame is a Fast Initial Link Setup (FILS) discovery frame, a beacon frame, or a broadcasted probe response frame.

9. The STA of claim 7, wherein:
   the channel congestion indicator indicates that the channel is not congested when the value of the channel congestion indicator is 0, and
   the channel congestion indicator indicates that the channel is congested when the value of the channel congestion indicator indicates is 1.

10. The STA of claim 7, wherein:
    the frame further includes a time interval when the channel congestion indicator indicates that the channel is congested, and
    the time interval includes information on a duration while which the STA is prohibited from transmitting a probe request frame for the active scanning.

11. The STA of claim 7, wherein:
the MLME-SCAN.change request primitive includes a changed scan type, and
the changed scan type indicates a passive scanning.

12. The STA of claim 7, wherein the channel congestion indicator includes a bitmap indicating each congestion status of a plurality of channels in channel list.

* * * * *